US006827886B2

(12) United States Patent
Neavin et al.

(10) Patent No.: US 6,827,886 B2
(45) Date of Patent: Dec. 7, 2004

(54) METHOD FOR MAKING MULTILAYER OPTICAL FILMS

(75) Inventors: Terence D. Neavin, St. Paul, MN (US); Andrew J. Ouderkirk, Woodbury, MN (US); Yaoqi J. Liu, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 582 days.

(21) Appl. No.: 09/810,916

(22) Filed: Mar. 16, 2001

(65) Prior Publication Data

US 2001/0013668 A1 Aug. 16, 2001

Related U.S. Application Data

(63) Continuation of application No. 09/229,724, filed on Jan. 13, 1999, now abandoned, which is a continuation-in-part of application No. 09/006,288, filed on Jan. 13, 1998, now abandoned.

(51) Int. Cl.[7] .......................... B29D 11/00; B29C 47/14
(52) U.S. Cl. .................. 264/1.6; 264/1.9; 264/173.12; 264/173.16
(58) Field of Search .......................... 264/1.1, 1.6, 1.7, 264/2.7, 1.9, 173.12, 173.16; 425/133.5, 462

(56) References Cited

U.S. PATENT DOCUMENTS

| 540,768 A | 6/1895 | Western |
| 2,803,552 A | 8/1957 | Stedman |
| 3,022,178 A | 8/1962 | Park et al. .................... 106/13 |
| 3,051,452 A | 8/1962 | Nobel ........................... 259/4 |
| 3,075,228 A | 1/1963 | Elias ............................ 15/506 |
| 3,124,639 A | 3/1964 | Kahn ............................ 88/65 |
| 3,182,965 A | 5/1965 | Sluijters ....................... 259/4 |
| 3,195,865 A | 7/1965 | Harder ......................... 259/4 |
| 3,212,909 A | 10/1965 | Leigh ........................... 106/13 |
| 3,557,265 A * | 1/1971 | Chisholm et al. ........... 264/46.1 |

(List continued on next page.)

FOREIGN PATENT DOCUMENTS

| DE | 24 35 807 | 2/1976 | ............. B29F/3/04 |
| EP | 591 055 | 9/1993 | ............. B32B/7/02 |
| EP | 592 284 | 9/1993 | ............. B32B/7/02 |
| EP | 616 885 | 9/1994 | ............. B21B/27/32 |
| EP | 0 796 716 | 2/1997 | |
| JP | Hei 641335 | 2/1994 | |
| WO | WO 92/11996 | 7/1992 | |
| WO | WO 95/27919 | 4/1995 | ............. G02B/27/28 |
| WO | WO 95/17303 | 6/1995 | ............. B32B/7/02 |
| WO | WO 95/17691 | 6/1995 | ............. G02B/5/30 |

(List continued on next page.)

OTHER PUBLICATIONS

Kirk Othmer Encyclopedia of Chemical Technology,, vol. 8, pp. 652–662 (4th Ed. 1993).

(List continued on next page.)

Primary Examiner—Mathieu D. Vargot
(74) Attorney, Agent, or Firm—Milena G. Higgins; Stephen C. Jensen

(57) ABSTRACT

Methods and apparatuses are provided for the manufacture of coextruded polymeric multilayer optical films. The multilayer optical films have an ordered arrangement of layers of two or more materials having particular layer thicknesses and a prescribed layer thickness gradient throughout the multilayer optical stack. The methods and apparatuses described allow improved control over individual layer thicknesses, layer thickness gradients, indices of refraction, interlayer adhesion, and surface characteristics of the optical films. The methods and apparatuses described are useful for making interference polarizers, mirrors, and colored films that are optically effective over diverse portions of the ultraviolet, visible, and infrared spectra.

9 Claims, 4 Drawing Sheets

U.S. PATENT DOCUMENTS

| | | | |
|---|---|---|---|
| 3,565,985 A | 2/1971 | Schrenk et al. | 264/171 |
| 3,610,729 A | 10/1971 | Rogers | 350/157 |
| 3,687,589 A | 8/1972 | Schrenk | 425/109 |
| 3,711,176 A | 1/1973 | Alfrey, Jr. et al. | 350/1 |
| 3,759,647 A | 9/1973 | Schrenk et al. | 425/131 |
| 3,773,882 A | 11/1973 | Schrenk | 264/171 |
| 3,819,522 A | 6/1974 | Zmoda | 252/89 |
| 3,825,645 A | 7/1974 | Barthelemy et al. | 264/177 |
| 3,860,036 A | 1/1975 | Newman, Jr. | 138/45 |
| 3,884,606 A | 5/1975 | Schrenk | 425/133.5 |
| 3,897,356 A | 7/1975 | Pociluyko | 252/91 |
| 4,061,462 A | 12/1977 | Gianarelli et al. | 425/464 |
| 4,144,011 A | 3/1979 | Sponaugle | |
| 4,249,011 A | 2/1981 | Wendling | |
| 4,348,349 A * | 9/1982 | Kurtz | 264/564 |
| 4,446,305 A | 5/1984 | Rogers et al. | 528/348 |
| 4,478,909 A | 10/1984 | Taniguchi et al. | 428/331 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,540,623 A | 9/1985 | Im et al. | 428/220 |
| 4,720,426 A | 1/1988 | Englert et al. | 428/344 |
| 4,848,564 A | 7/1989 | Scheller et al. | 206/83.5 |
| 4,880,370 A * | 11/1989 | Krumm | 425/133.5 |
| 4,937,134 A | 6/1990 | Schrenk et al. | 428/213 |
| 5,094,788 A | 3/1992 | Schrenk et al. | 264/171 |
| 5,094,793 A | 3/1992 | Schrenk et al. | 264/171 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| RE34,605 E | 5/1994 | Schrenk et al. | 359/359 |
| 5,316,703 A | 5/1994 | Schrenk | 264/1.3 |
| 5,319,478 A | 6/1994 | Fijnfschilling et al. | 359/53 |
| 5,360,659 A | 11/1994 | Arends et al. | 428/216 |
| 5,389,324 A | 2/1995 | Lewis et al. | 264/171 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,540,978 A | 7/1996 | Schrenk | 428/212 |
| 5,568,316 A | 10/1996 | Schrenk et al. | 359/584 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,759,467 A | 6/1998 | Carter et al. | 264/173.12 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,828,488 A | 10/1998 | Ouderkirk et al. | 359/487 |
| 5,882,774 A | 3/1999 | Jonza et al. | 428/212 |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |
| 5,976,424 A | 11/1999 | Weber et al. | 264/1.6 |
| 6,111,697 A | 8/2000 | Merrill et al. | |
| 6,113,811 A | 9/2000 | Kausch et al. | 252/585 |
| 6,157,490 A | 12/2000 | Wheatley et al. | |
| 6,179,948 B1 | 1/2001 | Merrill et al. | |
| 6,207,260 B1 | 3/2001 | Wheatley et al. | |
| 6,368,699 B1 | 4/2002 | Gilbert et al. | |
| 2001/0011779 A1 | 8/2001 | Stover | |
| 2001/0019182 A1 | 9/2001 | Hebrink et al. | |

FOREIGN PATENT DOCUMENTS

| | | | |
|---|---|---|---|
| WO | WO 95/17692 | 6/1995 | G02B/5/30 |
| WO | WO 95/17699 | 6/1995 | G02F/1/1335 |
| WO | WO 96/18691 | 6/1996 | |
| WO | WO 96/19347 | 6/1996 | B32B/7/02 |
| WO | WO 97/01440 | 1/1997 | B32B/27/36 |
| WO | WO 97/01774 | 1/1997 | G02B/1/10 |
| WO | WO 97/32226 | 9/1997 | G02B/5/30 |
| WO | WO 99/06203 | 2/1999 | B29C/47/06 |
| WO | WO 99/36248 | 7/1999 | B29C/47/70 |
| WO | WO 99/36262 | 7/1999 | B32B/27/00 |
| WO | WO 99/36812 | 7/1999 | G02B/5/30 |

OTHER PUBLICATIONS

Ferry, Viscoelastic Properties of Polymers, John Wiley & Sons, New York, 1970, pp. 314–318.

Schrenk et al., Nanolayer polymeric optical films, Tappi Journal, pp. 169–174, Jun., 1992.

Weber et al., "Giant Birefringent Optics in Multilayer Polymer Mirrors", Science, vol. 287, Mar. 31, 2000, pp. 2451–2456.

* cited by examiner

METHOD FOR MAKING MULTILAYER OPTICAL FILMS

CROSS-REFERENCE TO RELATED APPLICATION

This application is a continuation of U.S. patent application Ser. No. 09/229,724, filed Jan. 13, 1999, now abandoned which is a continuation-in-part of U.S. patent application Ser. No. 09/006,288 filed on Jan. 13, 1998, now abandoned, and incorporated herein by reference.

FIELD OF THE INVENTION

The present invention relates to processes for making polymeric multilayered films, and in particular to coextruded multilayered optical films having alternating polymeric layers with differing indices of refraction wherein at least one of the polymers is able to develop and maintain a large birefringence when stretched.

BACKGROUND OF THE INVENTION

The present invention relates to processes for making polymeric multilayered films, and more particularly to coextruded multilayered optical films having alternating polymeric layers with differing indices of refraction. Various process have been devised for making multilayer film structures that have an ordered arrangement of layers of various materials having particular layer thicknesses. Exemplary of these structures are those which produce an optical or visual effect because of the interaction of contiguous layers of materials having different refractive indices and layer thicknesses.

Multilayer films have previously been made or suggested to be made by the use of complex coextrusion feedblocks alone, see, e.g., U.S. Pat. Nos. 3,773,882 and 3,884,606 to Schrenk, and the suggestion has been made to modify such a device to permit individual layer thickness control as described in U.S. Pat. No. 3,687,589 to Schrenk. Such modified feedblocks could be used to make a multilayer film with a desired layer thickness gradient or distribution of layer thicknesses. These devices are very difficult and costly to manufacture, and are limited in practical terms to making films of no more than about three hundred total layers. Moreover, these devices are complex to operate and not easily changed over from the manufacture of one film construction to another.

Multilayer films have also been made by a combination of a feedblock and one or more multipliers or interfacial surface generators in series, for example as described in U.S. Pat. Nos. 3,565,985 and 3,759,647 to Schrenk et al. Such a combination of a feedblock and interfacial surface generator is more generally applicable for producing a film having a large number of layers because of the greater flexibility or adaptability and lesser manufacturing costs associated with a feedblock/ISG combination. An improved ISG for making multilayer films having a prescribed layer thickness gradient in the thicknesses of layers of one or more materials from one major surface of the film to an opposing surface was described in U.S. Pat. Nos. 5,094,788 and 5,094,793 to Schrenk et al. Schrenk described a method and apparatus in which a first stream of discrete, overlapping layers is divided into a plurality of branch streams which are redirected or repositioned and individually symmetrically expanded and contracted, the resistance to flow and thus the flow rates of each of the branch streams are independently adjusted, and the branch streams are recombined in an overlapping relationship to form a second stream which has a greater number of discrete, overlapping layers distributed in the prescribed gradient. The second stream may be symmetrically expanded and contracted as well. Multilayer films made in this way are generally extremely sensitive to thickness changes, and it is characteristic of such films to exhibit streaks and spots of nonuniform color. Further, the reflectivity of such films is highly dependent on the angle of incidence of light impinging on the film. Films made with the materials and processes heretofore described are generally not practical for uses which require uniformity of reflectivity.

Several of the patents and applications discussed above contain teachings with respect to introducing layer thickness gradients into multilayer polymeric bodies. For example, U.S. Pat. No. 3,711,176 to Schrenk et al., teaches that it is desirable that a gradient or other distribution in the thicknesses of layers of one or more materials be established through the thickness of the film. Methods for creating gradients include embossing the film, selective cooling of the film during final stretching, and the use of a rotating die to create the layers as described in U.S. Pat. Nos. 3,195,865; 3,182,965; and 3,051,452. These techniques attempted to introduce layer thickness gradients into an already extruded film, and did not permit precise generation or control of the gradients. U.S. Pat. No. 3,687,589 to Schrenk et al teaches the use of a rotating or reciprocating shear producing means to vary the volume of material entering the feed slots of a coextrusion feedblock where the polymer streams are subdivided. Precise control of volumetric flow rates using such a device is difficult to achieve. In U.S. Pat. No. 5,094,788, Schrenk et al teach using variable vanes in an ISG downstream from a coextrusion die to introduce a layer thickness gradient into a multilayer polymer melt stream. U.S. Pat. No. 5,389,324 to Lewis et al describes control of the respective flow rates of the polymeric materials in the substreams to provide a differential in the volume of material flowing through each of the substreams. Because of the differential in the volume of the polymeric materials flowing in the substreams making up the composite stream, the individual layers in the body have a gradient in the thicknesses. The flow rate is controlled either by providing a temperature differential among at least some of the substreams, causing changes in the viscosities of the polymeric materials and thereby controlling their flow, or the flow rate is controlled by modifying the geometry of the passages or feed slots through which the plastified polymeric materials flow in the feedblock. In this way, the path lengths, widths, or heights of the substreams can be modified to control the flow rate of the polymer streams and thus the thickness of the layers formed.

To form a multilayered film, after exiting either a feedblock or a combined feedblock/ISG, a multilayered stream typically passes into an extrusion die which is constructed so that streamlined flow is maintained and the extruded product forms a multilayered film in which each layer is generally parallel to the major surface of adjacent layers. Such an extrusion device is described in U.S. Pat. No. 3,557,265 to Chisholm et al. One problem associated with microlayer extrusion technology has been flow instabilities which can occur when two or more polymers are simultaneously extruded through a die. Such instabilities may cause waviness and distortions at the polymer layer interfaces, and in severe cases, the layers may become intermixed and lose their separate identities, termed layer breakup. The importance of uniform layers, i.e., layers having no waviness, distortions, or intermixing, is paramount in applications where the optical properties of the multilayered article are used. Even modest instabilities in processing, resulting in layer breakup in as few as 1% of the layers, may severely detract from the reflectivity or appearance of an article. To form highly reflective bodies or films, the total number of layer interfaces must be increased, and as the number of layers in such articles is increased in the coextrusion apparatus, individual layer thicknesses become smaller so that the breakup of even a relatively few layers can cause substantial deterioration of the optical properties on the article. Problems of layer breakup are especially severe for multilayered bodies in which individual layer thicknesses approach about 10 μm or less adjacent to the walls of the feedblock, multiplier, or extrusion die. Flow of multiple polymer layers through the feedblock and ISG typically entails both shear and extensional flow, while flow outside of the extrusion die is shear-free extensional flow. Layer breakup occurs inside flow channels very close to the channel walls where shear flow predominates, and is affected by such factors as small layer thickness, shear stress, interfacial tension between polymer layers, interfacial adhesion between the polymer melt and channel walls, and various combinations of these factors.

Several potential suggestions have been made to minimize flow instability, including increasing skin layer thickness nearest the die wall, decreasing the viscosity of the layer nearest the die wall by either increasing temperature or switching to a lower viscosity resin, reducing the total extrusion rate, or increasing the die gap. In U.S. Pat. No. 4,540,623 to Im et al, the use of sacrificial or integral skin layers on the order of from about 1 to 10 mils (25.4 to 254 μm) is described to ease processing and to protect the surfaces from damage. These exterior skin layers are added immediately prior to the multilayer film exiting from the forming die or prior to layer multiplication. In U.S. Pat. No. 5,269,995 to Ramanathan et al, the use of protective boundary layers (PBLs) of a heat plastified extrudable thermoplastic material is taught to minimize layer instabilities. These layers may be internal to the multilayer body and/or on the external surfaces and generally serve to prevent layer breakup during the formation and manipulation of the multiple layers of polymers in a coextruded multilayer polymeric body.

While the previous discussion applies to multilayered films in general, often independent of the chemical, physical, or optical properties of the materials that make up the multilayered stack, by selective choice of materials and proper control of subsequent processing steps, multilayered films with enhanced optical or physical properties can be obtained. For example, U.S. Pat. Nos. 5,486,949 and 5,612,820 to Schrenk et al describe the use of birefringent polymers for the fabrication of coextruded polymeric multilayer optical films useful as interference polarizers. The birefringent polymers can be oriented by uniaxial or biaxial stretching to orient the polymer on a molecular level such as taught in U.S. Pat. No. 4,525,413 to Rogers et al. in order to obtain desired matches or mismatches of the in-plane refractive indices to reflect or transmit desired polarizations. Further, in U.S. patent application Ser. No. 08/402,041 to Jonza et al the use of birefringent materials useful for making interference polarizers and mirrors is described in which control of the relationships between the in-plane and out-of-plane indices of refraction gives coextruded polymeric multilayer optical films with improved optical properties at non-normal angles.

Recent developments in materials available for use in making polymeric multilayer optical films, and new uses for optical films which require improved control of layer thickness and/or the relationships between the in-plane and out-of-plane indices of refraction, have been identified. Processes described heretofore typically are not able to exploit the potential of the new resins available and do not provide the required degree of versatility and control over absolute layer thickness, layer thickness gradients, indices of refraction, orientation, and interlayer adhesion that is needed for the routine manufacture of many of these films. Accordingly, there exists a need in the art for an improved process for making coextruded polymeric multilayer optical films with greater versatility and enhanced control over several steps in the manufacturing process.

SUMMARY OF THE INVENTION

The present invention relates to methods and apparatuses for making multilayered optical films.

In brief summary, a useful feedblock useful for making a multilayer optical film of the invention comprises: (a) a gradient plate comprising at least first and second flow channels, wherein at least one of the flow channel has a cross-sectional area that changes from a first position to a second position along the flow channel; (b) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die; and (c) an axial rod heater located proximal to said conduits.

In brief summary, a method for making a multilayered optical film comprises the steps of: (a) providing at least a first and a second stream of resin; (b) dividing the first and the second streams into a plurality of layers using a feedblock comprising: (i) a gradient plate comprising first and second flow channels, where the first channel has a cross-sectional area that changes from a first position to a second position along the flow channel; (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die; and (c) an axial rod heater located proximal to said conduits (c) passing the composite stream through an extrusion die to form a multilayer web in which each layer is generally parallel to the major surface of adjacent layers; and (d) casting the multilayer web onto a casting roll to form a cast multilayer film.

In brief summary, a method of making a textured multilayer optical film comprises the steps of: (a) providing at least a first and a second stream of resin; (b) dividing the first and the second streams into a plurality of layers such that the layers of the first stream are interleaved with the layers of the second stream to yield a composite stream; (c) passing the composite stream through an extrusion die to form a multilayer web in which each layer is generally parallel to the major surface of adjacent layers; (d) casting the multilayer web onto a casting roll; and (e) contacting the multilayer web by a micro-embossing roll to form a cast multilayer film.

In yet another method of making a multilayer optical film, the method comprises the steps of: (a) providing at least a first and a second stream of resin, wherein the first stream of resin is a copolymer of polyethylene naphthalate (coPEN) and the second stream of resin is polymethyl methacrylate (PMMA), (b) dividing the first and the second streams into a plurality of layers such that the layers of the first stream are interleaved with the layers of the second stream to yield a composite stream; (c) coextruding the composite stream through a die to form a multilayer web wherein each layer is generally parallel to the major surface of adjacent layers, wherein the coPEN and PMMA resins are coextruded at a melt temperature of about 260° C., and wherein the birefringence of the coPEN resin is reduced by about 0.02 units or less compared to the birefringence of a homopolymer PEN resin for a given draw ratio; and (d) casting the multilayer web onto a casting roll to form a cast multilayer film.

BRIEF DESCRIPTION OF THE DRAWINGS

The invention may be more completely understood in consideration of the following detailed description of various embodiments of the invention in connection with the accompanying drawings, in which.

These figures are idealized, are not to scale, and are intended to be merely illustrative and non-limiting.

DETAILED DESCRIPTION OF THE INVENTION

Various process considerations are important in making high quality polymeric multilayer optical films and other optical devices in accordance with the present invention. Such optical films include, but are not limited to, interference polarizers, mirrors, colored films, and combinations thereof. The films are optically effective over diverse portions of the ultraviolet, visible, and infrared spectra. Of particular interest are coextruded polymeric multilayer optical films having one or more layers that are birefringent in nature. The process conditions used to make each depends in part on (1) the particular resin system used and (2) the desired optical properties of the final film.

Figure 1:
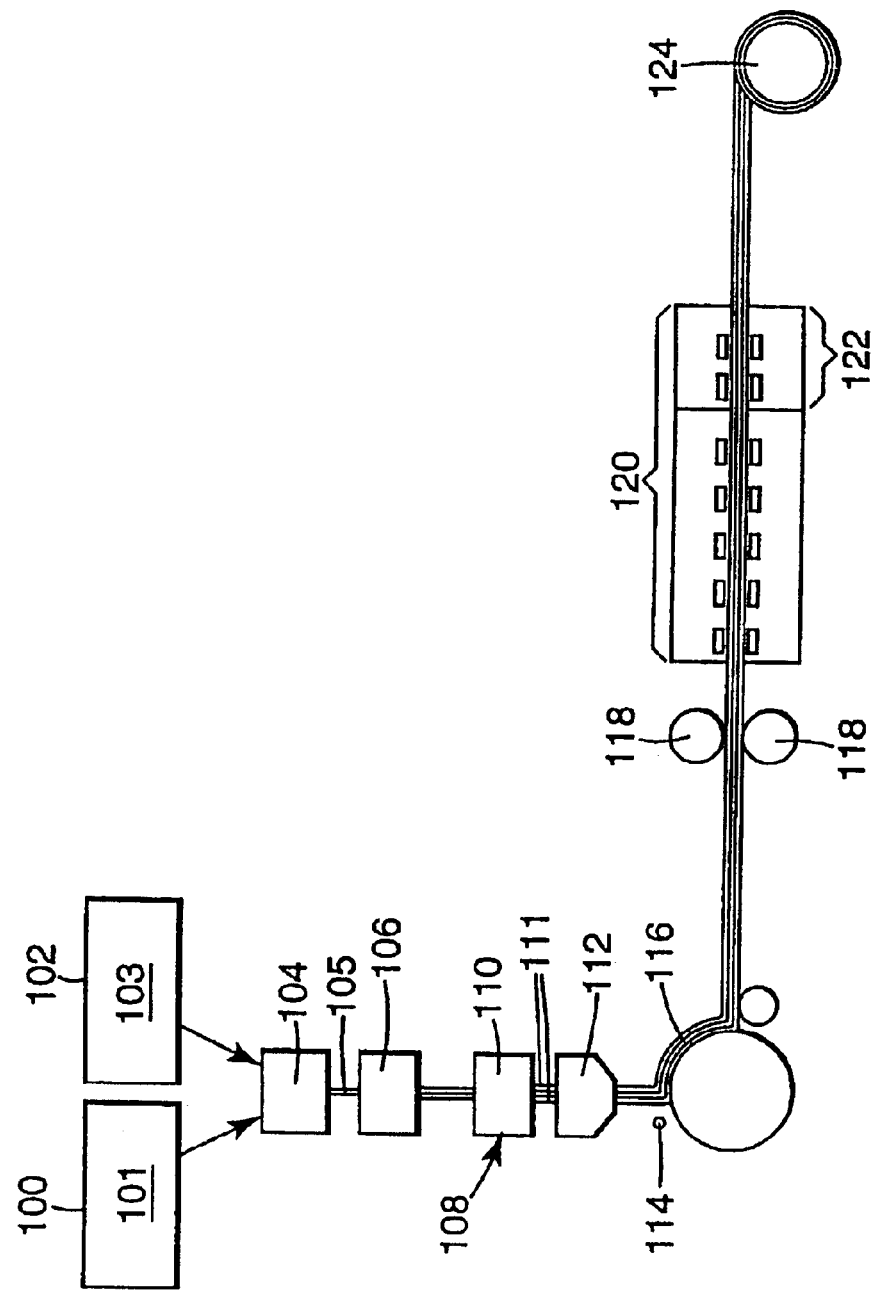
FIG. 1 is a schematic drawing illustrating the general process useful for the coextrusion of multilayered optical films made in accordance with the present invention.

A preferred method of making the multilayer film of the present invention is illustrated schematically in FIG. 1. Materials 100 and 102, selected to have suitably different optical properties, are heated above their melting and/or glass transition temperatures and fed into a multilayer feedblock 104. Typically, melting and initial feeding is accomplished using an extruder for each material. For example, material 100 can be fed into an extruder 101 while material 102 can be fed into an extruder 103. Exiting from the feedblock 104 is a multilayer flow stream 105. A layer multiplier 106 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. If desired, skin layers 111 may be introduced into the multilayer optical film by feeding resin 108 (for skin layers) to a skin layer feedblock 110.

The multilayer feedblock feeds a film extrusion die 112. Feedblocks useful in the manufacture of the present invention are described in, for example, U.S. Pat. No. 3,773,882 (Schrenk) and U.S. Pat. No. 3,884,606 (Schrenk), the contents of which are incorporated by reference herein. As an example, the extrusion temperature may be approximately 295° C., and the feed rate approximately 10–150 kg/hour for each material. It is desirable in most cases to have skin layers 111 flowing on the upper and lower surfaces of the film as it goes through the feedblock and die. These layers serve to dissipate the large stress gradient found near the wall, leading to smoother extrusion of the optical layers. Typical extrusion rates for each skin layer would be 2–50 kg/hr (1–40% of the total throughput). The skin material can be the same material as one of the optical layers or be a different material. An extrudate leaving the die is typically in a melt form.

The extrudate is cooled on a casting wheel 116, which rotates past pinning wire 114. The pinning wire pins the extrudate to the casting wheel. To achieve a clear film over a broad range of angles, one can make the film thicker by running the casting wheel at a slow speed, which moves the reflecting band towards longer wavelengths. The film is oriented by stretching at ratios determined by the desired optical and mechanical properties. Longitudinal stretching can be done by pull rolls 118. Transverse stretching can be done in a tenter oven 120. If desired, the film can be bi-axially oriented simultaneously. Stretch ratios of approximately 3–4 to 1 are preferred, although ratios as small as 2 to 1 and as large as 6 to 1 may also be appropriate for a given film. Stretch temperatures will depend on the type of birefringent polymer used, but 2° to 33° C. (5° to 60° F.) above its glass transition temperature would generally be an appropriate range. The film is typically heat set in the last two zones 122 of the tenter oven to impart the maximum crystallinity in the film and reduce its shrinkage. Employing a heat set temperature as high as possible without causing film breakage in the tenter reduces the shrinkage during a heated embossing step. A reduction in the width of the tenter rails by about 1–4% also serves to reduce film shrinkage. If the film is not heat set, heat shrink properties are maximized, which may be desirable in some security packaging applications. The film can be collected on windup roll 124.

In some applications, it may be desirable to use more than two different polymers in the optical layers of the multilayer film. In such a case, additional resin streams can be fed using similar means to resin streams 100 and 102. A feedblock appropriate for distributing more than two layer types analogous to the feedblock 104 could be used.

Figure 2:
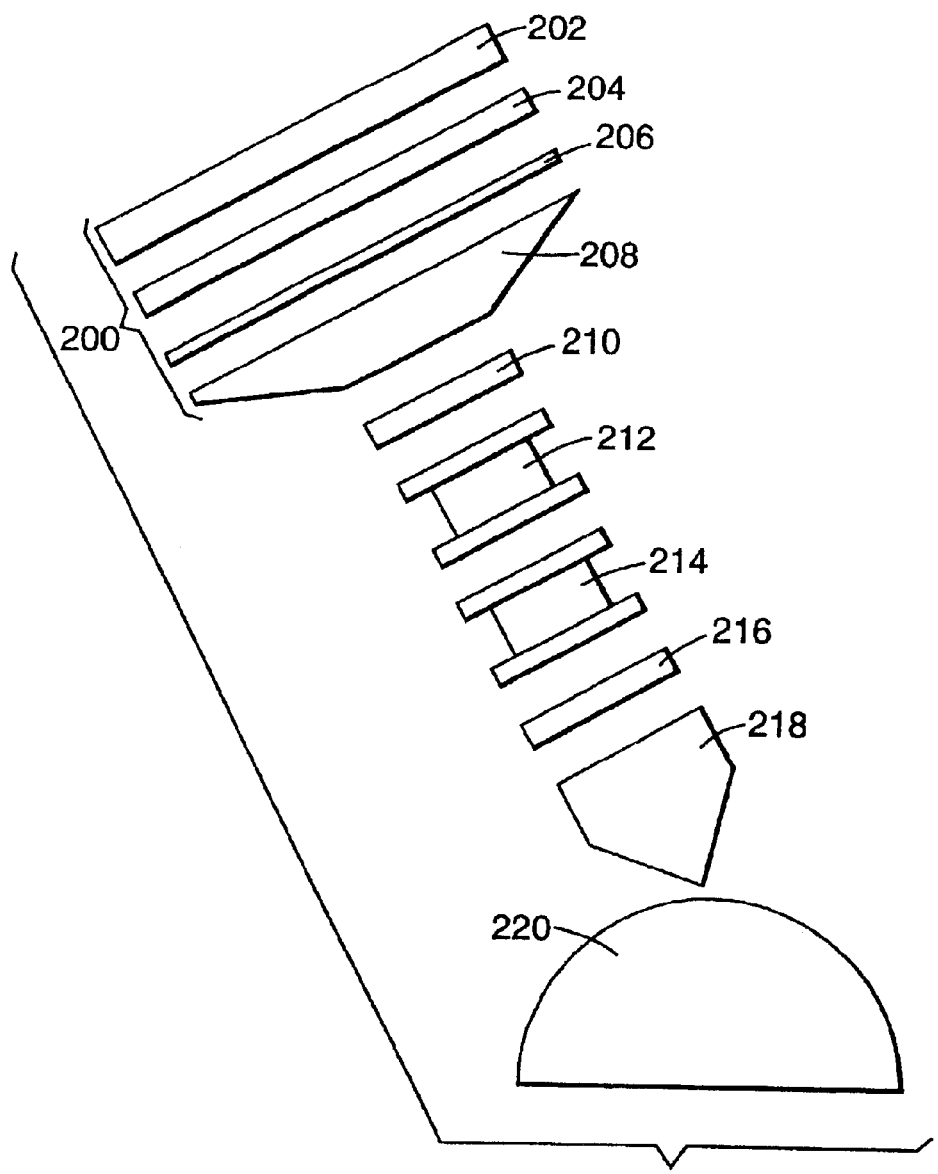
FIG. 2 is a schematic diagram a portion of the apparatuses useful in the process of making a multilayered optical film of the present invention.

FIG. 2 is a schematic representation of a portion of a typical set-up useful for the practice of the present invention. Feedblock 200 has four sections: a gradient plate 202, a feeder tube plate 204, an optional slot plate 206, and optional compression section 208. The slot plate houses a plurality of individual slots, which is a part of the slot die (not shown). Alternatively, the slots can be a part of the feeder tube plate. The compression section is typically located in the feedblock, although it does not need to be. Adjacent to the feedblock is a unit 210 useful for the introduction of protective boundary layers. Although multipliers 212 and 214 are shown, it is within the scope of this invention to use no multipliers or at least one multiplier to increase the number of layers in the multilayer optical film. A unit 216 is useful for the introduction of skin layers, if desired. A film casting die 218 begins the formation of the multilayer film. Extrudate exiting the casting die is allowed to contact a casting wheel 220. The casting wheel is typically cooled to quench the extrudate and form a film. Additional processing, such as drawing, orienting, and heat-setting the inventive multilayer film can also be done.

The above description is intended to provide an overview of the method and apparatus encompassed within the present invention. It should be understood, however, that the intention is not to limit the invention to the particular embodiments described, but to cover all modifications, equivalents, and alternatives falling within the spirit and scope of the invention as defined by the appended claims.

Material Selection

A variety of polymer materials suitable for use in the present invention have been taught for use in making coextruded multilayer optical films. For example, the polymer materials listed and described in U.S. Pat. Nos. 4,937,134, 5,103,337, 5,1225,448,404, 5,540,978, and 5,568,316 to Schrenk et al., and in U.S. Pat. Nos. 5,122,905, 5,122,906, and 5,126,880 to Wheatley and Schrenk are useful for making multilayer optical films according to the present invention. Of special interest are birefringent polymers such as those described in U.S. Pat. Nos. 5,486,949 and 5,612,820 to Schrenk et al; in U.S. patent application Ser. No. 08/402,041 to Jonza et al.; and in U.S. patent application Ser. No. 09/006,601 entitled "Modified Copolyesters and Improved Multilayer Reflective Films" filed Jan. 13, 1998, are of which are incorporated by reference. Regarding the preferred materials from which the films are to be made, there are several conditions which should be met to make the multilayer optical films of this invention. First, these films should consist of at least two distinguishable polymers. The number of polymers is not limited, and three or more polymers may be advantageously used in particular films. Second, at least one of the two required polymers, commonly referred to as the "first polymer," preferably has a stress optical coefficient having a large absolute value. In other words, the first polymer preferably develops a large birefringence when stretched. Depending on the application of the multilayer film, the birefringence may be developed between two orthogonal directions in the plane of the film, between one or more in-plane directions and the direction perpendicular to the film plane, or a combination of these. In the special case that the isotropic indices are widely separated, the preference for large birefringence in the first polymer may be relaxed, although birefringence is still usually desirable. Such special cases may arise in the selection of polymers for mirror films and for polarizer films formed using a biaxial process, which draws the film in two orthogonal in-plane directions. Third, the first polymer should be capable of maintaining birefringence after stretching, so that the desired optical properties are imparted to the finished film. Fourth, the other required polymer, commonly referred to as the "second polymer," should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will typically be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will typically be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may typically be chosen so that, after processing, its refractive index will match that of the first polymer in either the stretching direction or the planar direction orthogonal to stretching. Further, the second polymer will typically be chosen such that the difference in index of refraction in the remaining planar direction is maximized, regardless of whether this is best accomplished by a very low or very high index of refraction in that direction.

There are several means to achieve the combination of planar index matching in one direction and mismatching in the orthogonal direction. For example, one can select a first polymer which develops significant birefringence when stretched, select a second polymer which develops little or no birefringence when stretched, and to stretch the resulting film in only one planar direction. In another method, the second polymer can be selected from among those which develop birefringence in the sense opposite to that of the first polymer (negative-positive or positive-negative). Another method involves selecting both first and second polymers which are capable of developing birefringence when stretched, but to stretch the multilayer film in two orthogonal planar directions. This latter method involves selecting process conditions (such as temperatures, stretch rates, post-stretch relaxation, and the like) that result in the development of unequal levels of orientation in the two stretching directions for the first and second polymers, such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing discussion for polarizing film is meant to be exemplary. It will be understood that combinations of these and other techniques may be used to achieve the index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane. Thus, typical for the indices for any given layer in orthogonal in-plane directions to be nearly equal. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses used in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Although many polymers may be chosen as the first polymer, certain of the polyesters have the capability for particularly large birefringence. Among these, polyethylene 2,6-naphthalate (PEN) is frequently chosen as a first polymer for films of the present invention. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornene and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids maybe used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoro ethylene, polyethylene-co-tri fluoro ethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly (aryl styrene)s, poly(styrene halide)s, poly(alkoxy styrene)s, poly(vinyl ester benzoate), poly(vinyl naphthalene), poly (vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly (butyl styrene). Examples of poly(aryl styrene)s include the isomers of poly(phenyl styrene). As for the poly(styrene halide)s, examples include the isomers of the following: poly(chlorostyrene), poly(bromostyrene), and poly (fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For mirror films, a match of the refractive indices of the first polymer and second polymer in the direction normal to the film plane is sometimes preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The crucial property is that the normal-to-plane index for one material must be closer to the in-plane indices of the other material than to its own in-plane indices.

In other embodiments, a deliberate mismatching of the normal-to-plane refractive index is desirable. Some examples include those involving three or more polymeric layers in the optical stack in which a deliberate mismatch in the normal-to-plane index is desirable opposite in sign to the index mismatch in one of the in-plane directions. It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Some preferred multicomponent constructions are described in U.S. patent application Ser. No. 09/006,118 filed Jan. 13, 1998 entitled "Multicomponent Optical Body," the contents of which are herein incorporated by reference.

Process Considerations

The process used for making the coextruded polymeric multilayer optical films of the present invention will vary depending on the resin materials selected and the optical properties desired in the finished film product.

Moisture sensitive resins should be dried before or during extrusion to prevent degradation. The drying can be done by any means known in the art. One well-known means employs ovens or more sophisticated heated vacuum and/or desiccant hopper-dryers to dry resin prior to its being fed to an extruder. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins should be dried to prevent damage to the moisture sensitive coextruded resin from moisture carried by the other resin.

Extrusion conditions are chosen to adequately feed, melt, mix and pump the polymer resin feed streams in a continuous and stable manner. Final melt stream temperatures are chosen within a range which avoids freezing, crystallization or unduly high pressure drops at the low end of the temperature range and which avoids degradation at the high end of the temperature range. For example, polyethylene naphthalate (PEN) is dried for 8 hours at 135° C. and then vacuum fed to an extruder with a final zone temperature, or melt temperature, ranging preferably between 270° C. and 300° C. and more preferably between 275° C. and 290° C.

It is often preferable for all polymers entering the multilayer feedblock to be at the same or very similar melt temperatures. This may require process compromise if two polymers, whose ideal melt processing temperatures do not match, are to be coextruded. For example, polymethyl methacrylate (PMMA) is typically extruded at a temperature below about 250° C. Applicants have found, however, that PMMA can be coextruded with PEN using PMMA melt temperatures as high as 275° C., provide that design considerations are made in the PMMA melt train to minimize the potential for stagnation points in the flow, and to hold to a minimum the overall residence time in the melt of the PMMA. Another technique found to be useful in this regard is to start up the PMMA melt train at the more conventional processing temperatures, and then to raise the melt train temperatures to the higher, PEN-compatible temperatures only when well-developed flow through the entire process has been attained.

Conversely, the PEN processing temperature may be reduced so as to match it to the typical melt processing temperatures for PMMA. Thus, it has also been found that the melting point, and hence, the processing temperature, of PEN may be reduced by the addition of comonomers into the PEN polymer with only a very slight accompanying reduction of the ability of the PEN to develop birefringence upon drawing. For example, a PEN copolymer made using DiMethyl Isophthalate (DMI) in place of 3 mol % of the 2,6-DiMethyl Naphthalate (DMN) monomer has been found to have a reduction in birefringence of only 0.02 units, and a reduction of glass transition temperature of only about 4 or 5° C., while the melt processing temperature is reduced by 15° C. Small amounts of DiMethyl Terephthalate (DMT) or other diacid or diol comonomers may also be usefull in this regard. Esters or diesters of the diacid comonomers may also be used. The advantages of adding comonomers into the PEN polymer are more fully described in U.S. patent applications Ser. No. 09/006,601 entitled "Modified Copolyesters and Improved Multilayer Reflective Film" and Ser. No. 09/006,468 entitled "Optical Device with a Dichroic Polarizer and Multilayer Optical Film," both filed on filed Jan. 13, 1998, the contents of which are incorporated herein by reference.

It will be evident to one skilled in the art that combinations of PEN process temperature reduction through copolymerization and PMMA melt temperature elevation via process design could be usefully employed, as could the combination of one, the other, or both techniques with still other techniques. Likewise, similar techniques could be employed for equal-temperature coextrusion of PEN with polymers other than PMMA, PMMA with polymers other than PEN, or combinations including neither of the two exemplary polymers.

Following extrusion, the melt streams are then filtered to remove undesirable particles and gels. Primary and secondary filters known in the art of polyester film manufacture may be used, with mesh sizes in the 1–30 micrometer range. While the prior art indicates the importance of such filtration to film cleanliness and surface properties, its significance in the present invention extends to layer uniformity as well. Each melt stream is then conveyed through a neck tube into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during processing.

Multilayer feedblocks are designed to divide two or more polymer melt streams into many layers each, interleave these layers, and merge the many layers of two or more polymers into a single multilayer stream. The layers from any given melt stream are created by sequentially bleeding off part of the stream from a flow channel into side channel tubes that feed layer slots for the individual layers in the feedblock. Many designs are possible, including those disclosed in U.S. Pat. Nos. 3,737,882; 3,884,606; and 3,687,589 to Schrenk et al. Methods have also been described to introduce a layer thickness gradient by controlling layer flow as described in U.S. Pat. Nos. 3,195,865; 3,182,965; 3,051,452; 3,687,589 and 5,094,788 to Schrenk et al, and in U.S. Pat. No. 5,389,324 to Lewis et al. In typical industrial processes, layer flow is generally controlled by choices made in machining the shape and physical dimensions of the individual side channel tubes and layer slots.

Applicants have discovered an improved feedblock design that allows for better control of the layer thickness distribution and of the layer uniformity. The improved design incorporates modular features so that only a few sections of the feedblock need to be machined for each unique film construction, as further described below. The economic advantage of the modular design is reduction in time, labor, and equipment needed to change from one film construction to another.

Figure 3:
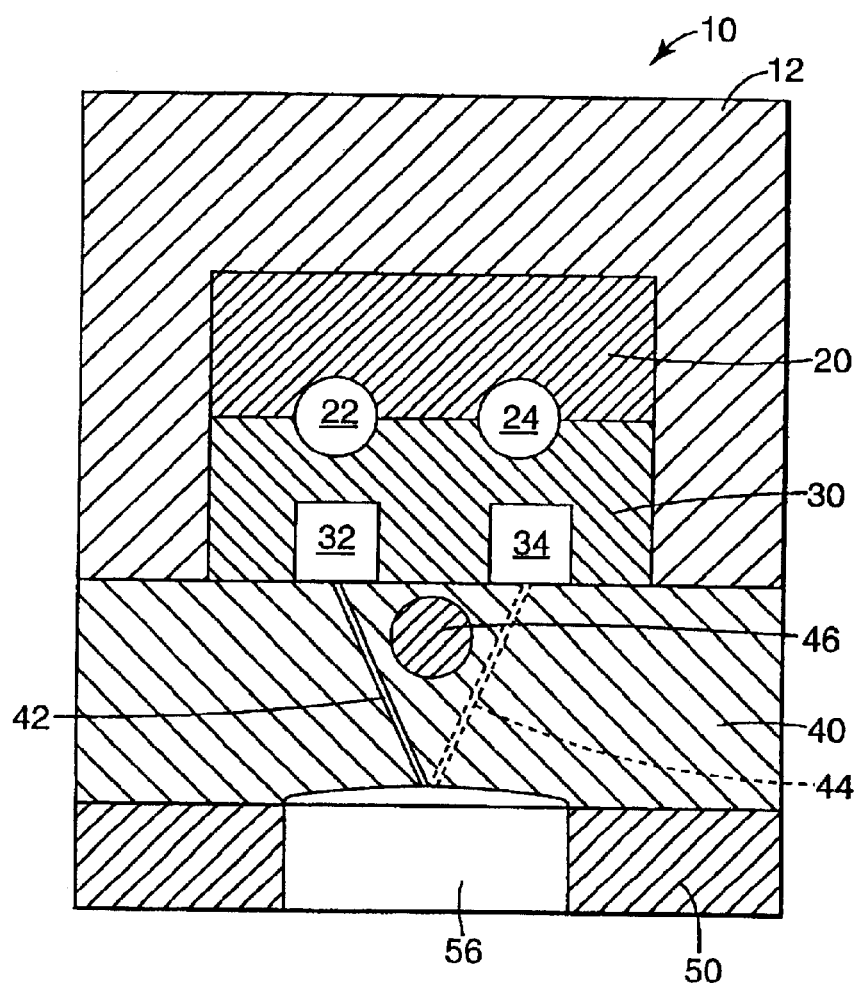
FIG. 3 is a schematic diagram of a feedblock useful in the process of making a multilayered optical film of the present invention.
Figure 4:
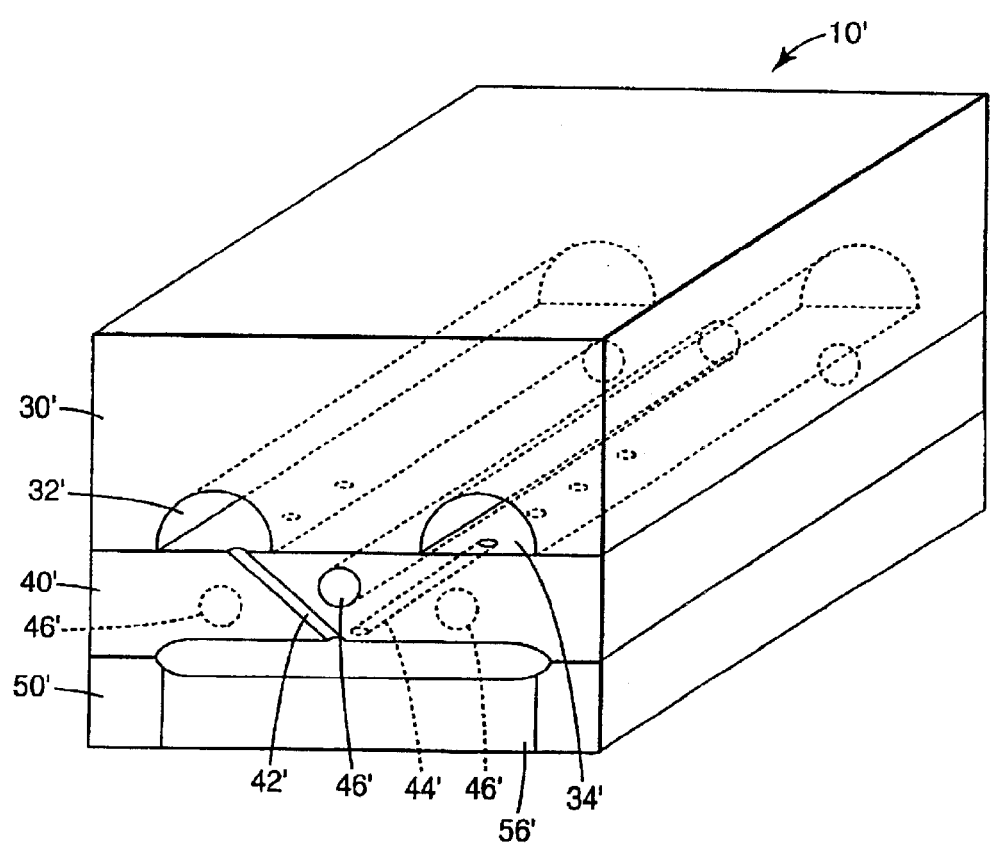
FIG. 4 is a perspective view of a feedblock similar to that of FIG. 3.

FIG. 3 shows a schematic cross-section feedblock 10, which is enclosed in a housing 12. Within the housing 12 reside an optional manifold plate 20 and a gradient plate 30, which in combination, define at least two supplemental channels, a first channel 22 and a second channel 24. As shown, a portion of the bottom surface of manifold plate 20 together with a portion of the top surface of gradient plate 30 define the supplemental channels 22 and 24. The supplemental channels are an optional feature of the feedblock, and they help convey resin from one position in the feedblock to another position. In addition, plate-type heaters (not shown) can be attached to the external surfaces of the housing 12.

Residing in gradient plate 30 are at least two flow channels, a first flow channel 32 and a second flow channel 34. The flow channels are bounded by a combination of the gradient plate 30 and a feeder tube plate 40. The first flow channel 32 is in fluid communication with the first supplemental channel 22 while second flow channel 34 is in fluid communication with second supplemental channel 24. When supplemental channels are used in combination with flow channels, transfer conduits (not shown) serve as the communication means to connect the two types of channels together. Although only a pair of supplemental channels and a pair of flow channels are shown, it is within the scope of this invention to use more than two channels of each type.

In the gradient plate 30, each flow channel is machined so that its cross-section has a central axis of symmetry, such as, e.g., a circle, square, or equilateral triangle. For ease of machining purposes, the square cross-section flow channel is preferably used. Along each flow channel, the cross-sectional area can remain constant or can change. The change may be an increase or decrease in area, and a decreasing cross-section is typically referred to as a "taper." A change in cross-sectional area of the flow channels can be designed to provide an appropriate pressure gradient, which affects the layer thickness distribution of a multilayer optical film. Thus, the gradient plate can be changed for different types of multilayer film constructions.

When the cross-sectional area of the flow channels is made to remain constant, a plot of layer thickness vs. layer number is non-linear and decreasing. For a given polymer flow, there exists at least one cross-sectional tapering profile which will result in a linear, decreasing dependency of layer thickness upon layer number, which is sometimes preferred. The taper profile can be found by one reasonably skilled in the art using reliable rheological data for the polymer in question and polymer flow simulation software known in the art, and should be calculated on a case-by-case basis.

Referring again to FIG. 3, the feedblock 10 further contains a feeder tube plate 40 that has a first set of conduits 42 and a second set of conduits 44, each set in fluid communication with flow channels 32 and 34 respectively. As used in this document, the "conduits" are also referred to as "side channel tubes." Optionally, residing in between the two sets of conduits is an axial rod heater 46, used to provide heat to the resin flowing in the conduits. If desired, temperature can be varied in zones along the length of the axial rod heater. Additional axial rod heaters can be used, for example, one adjacent to conduit 42 and another adjacent to conduit 44. Each conduit feeds its own respective slot die 56, which has an expansion section and a slot section. The expansion section typically resides in the feeder tube plate 40. If desired, the slot section can reside in a slot plate 50. As used in this document, the term "slot die" is synonymous with "layer slot." The first set of conduits 42 is interleaved with the second set of conduits 44 to form alternating layers.

In use, polymeric resins, in the form of a melt stream, are delivered to the supplemental channels 22 and 24, if present, from a source, such as an extruder. Typically, a different resin is delivered to each supplemental channel. For example, resin A is delivered to channel 22 and resin B is delivered to channel 24 as two distinct melt streams. If supplemental channels are not used, resin A and resin B would be delivered directly to the flow channels 32 and 34. As the melt stream A and melt stream B travel down the flow channels in the gradient plate 30, each melt stream is bled off by the conduits. Because the conduits 42 and 44 are interleaved, they begin the formation of alternating layers, such as, for example, ABABAB. Each conduit has its own slot die to begin the formation of an actual layer. The melt stream exiting the slot die contains a plurality of alternating layers. The melt stream is fed into a compression section (not shown) where the layers are compressed and also uniformly spread out transversely. Special thick layers known as protective boundary layers (PBLs) may be fed nearest to the feedblock walls from any of the melt streams used for the optical multilayer stack. The PBLs can also be fed by a separate feed stream after the feedblock. The PBLs function to protect the thinner optical layers from the effects of wall stress and possible resulting flow instabilities.

In optical applications, especially for films intended to transmit or reflect a specific color(s), very precise layer thickness uniformity in the film plane is required. Perfect layer uniformity following a transverse spreading step, occurring in the slot die, is difficult to achieve in practice. The greater the amount of transverse spreading required, the higher the likelihood of non-uniformity in the resulting layer thickness profile. Thus, it is advantageous from the standpoint of layer thickness profile uniformity (or for film color uniformity) for the feedblock's slot die to be relatively wide. However, increasing the widths of the slot die results in a larger, heavier, and more expensive feedblock. It will be apparent that an assessment of the optimal slot widths must be made individually for each feedblock case, taking into consideration the optical uniformity requirements of the resulting film. This assessment can be done using reliable Theological data for the polymer in question and polymer flow simulation software known in the art, along with a model for feedblock fabrication costs.

Control of layer thickness is especially useful in producing films having specific layer thicknesses or thickness gradient profiles that are modified in a prescribed way throughout the thickness of the multilayer film. For example, several layer thickness designs have been described for infrared films, which minimize higher order harmonics. Such harmonics can cause color in the visible region of the spectrum. Examples of such film include those described in U.S. Pat. No. RE 34,605, incorporated herein by reference, which describes a multilayer optical interference film comprising three diverse substantially transparent polymeric materials, A, B, and C and having a repeating unit of ABCB. The layers have an optical thickness of between about 0.09 and 0.45 micrometers, and each of the polymeric materials has a different index of refraction, $n_i$. The film includes polymeric layers of polymers A, B, and C. Each of the polymeric materials has its own different refractive index, $n_A$, $n_B$, $n_C$, respectively. A preferred relationship of the optical thickness ratios of the polymers produces an optical interference film in which multiple successive higher order reflections are suppressed. In this embodiment, the optical thickness ratio of first material A, $f_A$, is ⅓, the optical thickness ratio of second material B, $f_B$, is ⅙, the optical thickness of third material C, $f_C$ is ⅓, and $n_B=\sqrt{n_A n_C}$.

For this embodiment, there will be an intense reflection at the first order wavelength, while the reflections at the second, third, and fourth order wavelengths will be suppressed. To produce a film that reflects a broad bandwidth of wavelengths in the solar infrared range (e.g., reflection at from about 0.7 to 2.0 micrometers), a layer thickness gradient may be introduced across the thickness of the film. For example, the layer thicknesses may increase monotonically across the thickness of the film. Preferably, in a three component system of the present invention, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Polymeric materials can be synthesized to have the desired index of refraction by using a copolymer or miscible blend of polymers. For example, the second polymeric material may be a copolymer or miscible blend of the first and third polymeric materials. By varying the relative amounts of monomers in the copolymer or polymers in the blend, any of the first, second, or third materials can be adjusted so that there is a refractive index relationship where $n_B=\sqrt{n_A n_C}$.

Another suitable film is described in U.S. Pat. No. 5,360,659, incorporated herein by reference. The patent describes a two component film having six layers alternating repeating unit. The film suppresses the unwanted second, third, and fourth order reflections in the visible wavelength region of between about 380–770 nm while reflecting light in the infrared wavelength region of between about 770–2000 nm. Reflections higher than fourth order will generally be in the ultraviolet, not visible, region of the spectrum or will be of such a low intensity as to be unobjectionable. The film comprises alternating layers of first (A) and second (B) diverse polymeric materials in which the six layers alternating repeat unit has relative optical thicknesses of about 0.778A0.111B0.111A0.778B0.111A0.111B. The use of only six layers in the repeat unit results in more efficient use of material and simpler manufacture than previous designs. A repeat unit gradient may be introduced across the thickness of the film. Thus, in one embodiment, the repeat unit thicknesses will increase linearly across the thickness of the film. By linearly, it is meant that the repeat unit thicknesses increase at a constant rate across the thickness of the film. In some embodiments, it may be desirable to force the repeat unit optical thickness to double from one surface of the film to another. The ratio of repeat unit optical thicknesses can be greater or less than two as long as the short wavelength range of the reflectance band is above 770 nm and the long wavelength edge is about 2000 nm. Other repeat unit gradients may be introduced by using logarithmic and/or quartic functions. A logarithmic distribution of repeat unit thicknesses will provide nearly constant reflectance across the infrared band.

In an another embodiment, the two component film may comprise a first portion and a second portion of alternating layers. The first portion has the six layers alternating layer repeat unit that reflects infrared light of wave lengths between about 1200–2000 nm. The second portion of alternating layers has an AB repeat unit, has substantially equal optical thickness, and reflects infrared light of wavelengths between about 770–1200 nm. Such a combination of alternating layers results in reflection of light across the infrared wavelength region through about 2000 nm. The combination is commonly known as a "hybrid design." Preferably, the first portion of the alternating layers has a repeat unit gradient of about 5/3:1, and the second portion of alternating layers have a layer thickness gradient of about 1.5:1. The hybrid design may be provided as described for example in U.S. Pat. No. 5,360,659, but has broader application in that it is useful with any of the broadband infrared reflectors or multicomponent optical designs described herein.

Another useful film design is described in U.S. patent application Ser. No. 09/006,118 filed Jan. 13, 1998 entitled "Multicomponent Reflective Film," which is incorporated herein by reference. Optical films and other optical bodies are described which exhibit a first order reflection band for at least one polarization of electromagnetic radiation in a first region of the spectrum. Such optical films suppress at least the second, and preferably also at least the third, higher order harmonics of the first reflection band, while the percentage reflection of the first order harmonic remains essentially constant, or increases, as a function of angle of incidence. This is accomplished by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively. Similarly, material B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively. The z-axis is orthogonal to the plane of the film or optical body. In the optical film, $n_x^A > n_x^B > n_x^C$ or $n_y^A > n_y^B > n_y^C$, and $n_z^C \geq n_z^B \geq n_z^A$. Preferably, at least one of the differences $n_z^A - n_z^B$ and $n_z^B - n_z^C$ is less than about −0.05.

By designing the film or optical body within these constraints, at least some combination of second, third and fourth higher-order reflections can be suppressed without a substantial decrease of the first harmonic reflection with angle of incidence, particularly when the first reflection band is in the infrared region of the spectrum. Such films and optical bodies are particularly useful as IR mirrors, and may be used advantageously as window films and in similar applications where IR protection is desired but good transparency and low color are important.

A modular feedblock of the type described herein, having a changeable gradient plate adaptable to vary the thickness of individual layer thicknesses or layer thickness profiles without necessitating changing or re-machining the entire feedblock assembly, is especially useful for modifying layer thickness profiles as described above.

The various layers in the film preferably have different thicknesses across the film. This is commonly referred to as the layer thickness gradient. A layer thickness gradient is selected to achieve the desired band width of reflection. One common layer thickness gradient is a linear one, in which the thickness of the thickest layer pairs is a certain percent thicker than the thickness of the thinnest layer pairs. For example, a 1.055:1 layer thickness gradient means that the thickest layer pair (adjacent to one major surface) is 5.5% thicker than the thinnest layer pair (adjacent to the opposite surface of the film). In another embodiment, the layer thickness could decrease, increase, and decrease again from one major surface of the film to the other. This is believed to provide sharper bandedges, and thus a sharper or more abrupt transition from reflective to transmissive regions of the spectrum. This preferred method for achieving sharpened bandedges is described more fully in U.S. patent application Ser. No. 09/006,085 entitled "Optical Film with Sharpened Bandedge" filed Jan. 13, 1998, the contents of which are herein incorporated by reference.

The method of achieving sharpened band edges will be briefly described for a multilayer film having layers arranged in an alternating sequence of two optical materials, "A" and "B". Three or more distinct optical materials can be used in other embodiments. Each pair of adjacent "A" and "B" layers make up an optical repeating unit (ORU), beginning at the top of the film with ORU1 and ending with ORU6, with the ORUs having optical thicknesses $OT_1$, $OT_2$, . . . $OT_6$. For maximum first order reflectance (M=1 in equation I) at a design wavelength, each of the ORUs should have a 50% f-ratio with respect to either the A or B layer. The A layers can be considered to have a higher X- (in-plane) refractive index than the B layers because the former are shown to be thinner than the latter. ORUs 1–3 may be grouped into a multilayer stack S1 in which the optical thickness of the ORUs decrease monotonically in the minus-Z direction, while ORUs 4–6 may be grouped into another multilayer stack S2 in which the optical thickness of the ORUs increase monotonically. Such thickness profiles are helpful in producing sharpened spectral transitions. In contrast, thickness profiles of previously known films typically increase or decrease monotonically in only one direction. If desired for some applications, a discontinuity in optical thickness can be incorporated between the two stacks to give rise to a simple notch transmission band spectrum.

Other thickness gradients may be designed which improve peak transmission and to make even steeper band edges (narrower transmission band). This can be achieved by arranging the individual layers into component multilayer stacks where one portion of the stacks has oppositely curved thickness profiles and the adjacent portions of the stacks have a slightly curved profile to match the curvature of the first portion of the stacks. The curved profile can follow any number of functional forms. The main purpose of the form is to break the exact repetition of thickness present in a quarter wave stack with layers tuned to only a single wavelength. The particular function used is an additive function of a linear profile and a sinusoidal function to curve the profile with an appropriate negative or positive first derivative. An important feature is that the second derivative of the ORU thickness profile be positive for the red (long wavelength) band edge of a reflectance stack and negative for the blue (short wavelength) band edge of a reflectance stack. The opposite sense is required if one refers to the band edges of the notched transmission band. Other embodiments incorporating the same principle include layer profiles that have multiple points with a zero value of the first derivative. In all cases here, the derivatives refer to those of a best fit curve fitted through the actual ORU optical thickness profile, which can contain small statistical errors of less than 10% sigma, one standard deviation in optical thickness values.

The multilayer stack exiting the feedblock may then directly enter a final shaping unit such as a die. Alternatively, the stream may be split, preferably normal to the layers, to form two or more multilayer streams that may be recombined by stacking. The stream may also be split at an angle other than that normal to the layers. A flow channeling system that splits and stacks the streams is called a multiplier or interfacial surface generator (ISG). The width of the split streams can be equal or unequal. The multiplier ratio is defined by the ratio of the wider to narrower stream widths. Unequal streams widths (i.e., multiplier ratios greater than unity) can be useful in creating layer thickness gradients. In the case of unequal streams, the multiplier should spread the narrower stream and/or compress the wider stream transversely to the thickness and flow directions to ensure matching layer widths upon stacking. Many designs are possible, including those disclosed in U.S. Pat. Nos. 3,565,985; 3,759,647; 5,094,788; and 5,094,793 to Schrenk et al. In typical practice, the feed to a multiplier is rectangular in cross-section, the two or more split streams are also rectangular in cross-section, and rectangular cross-sections are retained through the flow channels used to re-stack the split streams. Preferably, constant cross-sectional area is maintained along each split stream channel, though this is not required.

Each original portion of the multilayer stack that exits the feedblock manifold, excluding PBLs, is known as a packet. In a film for optical applications, each packet is designed to reflect, transmit, or polarize over a given band of wavelengths. More than one packet may be present as the multilayer stack leaves the feedblock. Thus, the film may be designed to provide optical performance over dual or multiple bands. These bands may be separate and distinct, or may be overlapping. Multiple packets may be made of the same or of different combinations of two or more polymers. Multiple packets in which each packet is made of the same two or more polymers may be made by constructing the feedblock and its gradient plate in such a way that one melt train for each polymer feeds all packets, or each packet may be fed by a separate set of melt trains. Packets designed to confer on the film other non-optical properties, such as physical properties, may also be combined with optical packets in a single multilayer feedblock stack.

An alternative to creating dual or multiple packets in the feedblock is to create them from one feedblock packet via the use of a multiplier with multiplier ratio greater than unity. Depending on the bandwidth of the original packet and the multiplier ratio, the resulting packets can be made to overlap in bandwidth or to leave between them a bandwidth gap. It will be evident to one skilled in the art that the best combination of feedblock and multiplier strategies for any given optical film will depend on many factors, and must be determined on an individual basis.

Prior to multiplication, additional layers can be added to the multilayer stack. These outer layers perform as PBLs, but this time, within the multiplier. After multiplication and stacking, part of the PBL streams will form internal boundary layers between optical layers, while the rest will form skin layers. Thus the packets are separated by PBLs in this case. Additional PBLs can be added and additional multiplication steps may be accomplished prior to final feed into a forming unit such as a die. Prior to the final feed, additional layers can be added to the outside of the multilayer stack, whether or not multiplication has been performed, and whether or not PBLs have been added prior to the multiplication step. The additional layers form the final skin layers and the external portions of the earlier-applied PBLs will form sub-skins under these final skin layers. The die performs the additional compression and width spreading of the melt stream. Again, the die (including its internal manifold, pressure zones, etc.) is designed to create uniformity of the layer distribution across the web as it exits the die.

Skin layers are frequently added to the multilayer stack to protect the thinner optical layers from the effects of wall stress and possible resulting flow instabilities. Other reasons for adding a thick layer at the surface(s) of the film include, e.g., surface properties such as adhesion, coatability, release, coefficient of friction, and barrier properties, weatherability, scratch and abrasion resistance, and others. In multilayer films that are subsequently uniaxially or very unequally biaxially drawn, "splittiness," (i.e., the tendency to tear or fail easily along the more highly drawn direction), can be substantially suppressed by choosing a skin layer polymer that (1) adheres well to the sub-skin or nearest optical layer polymer and (2) is less prone to orientation upon draw. An example of a useful skin layer, where the optical stack contains a PEN homopolyer, is a copolymer of PEN having a comonomer content sufficient to suppress crystallinity and/or crystalline orientation. Marked suppression of splittiness is observed in such a structure, compared to a similar film without the coPEN skin layer(s), when the films are highly drawn in one planar direction and undrawn or only slightly drawn in the orthogonal planar direction. One skilled in the art will be able to select similar skin layer polymers to complement other optical layer polymers and/or sub-skin polymers.

Temperature control is important in the feedblock and subsequent flow leading to casting at the die lip. While temperature uniformity is often desired, in some cases, deliberate temperature gradients in the feedblock or temperature differences of up to about 40° C. in the feed streams can be used to narrow or widen the stack layer thickness distribution. Feed streams into the PBL or skin blocks can also be set at different temperatures than the feedblock average temperature. Often, the PBL or skin streams are about 40° C. higher than the feed stream temperature to reduce viscosity or elasticity in the protective streams and thus enhance their effectiveness as protective layers. Sometimes, the protective streams' temperature can be decreased up to about 40° C. to improve the rheology matching between them and the rest of the flow stream. For example, decreasing the temperature of a low viscosity skin may enhance viscosity matching and enhance flow stability. Other times, elastic effects need to be matched.

Conventional means for heating the feedblock-multiplier-die assembly, namely, the use of insertion- or rod- or cartridge-type heaters fitted into bores in the assembly, are frequently incapable of providing the temperature control required for the inventive optical films. Preferably, heat is provided uniformly from outside the assembly by (i) tiling its exterior with plate-type heaters, (ii) insulating thoroughly the entire assembly, or (iii) combining the two techniques. Plate-type heaters typically use a resistance-heating element embedded in a metal material, such as cast aluminum. Such heaters can distribute heat uniformly to an apparatus, such as, e.g., the feedblock.

The use of insulation to control heat flow is not new. It is, however, typically not done in film extrusion due to the possibility of polymer melt leakage from the assembly onto the insulation. Because of the need to regulate layer flows very precisely, such leakage cannot be tolerated in the feedblock-multiplier-die assemblies used for the inventive optical films. Thus, feedblocks, multipliers, and dies are carefully designed, machined, assembled, connected, and maintained so as to prevent polymer melt leakage, and insulation of the assembly becomes both feasible and preferred.

An insertion- or rod- or cartridge-type heater, having both a specific design and specific placement within the feedblock, is advantageous both for maintaining constant temperature in the feedblock and for creating a temperature gradient of up to about 40° C. This heater, called an axial rod heater, consists of a heater placed in a bore through the feedblock and oriented in a direction normal to the layer plane, preferably very near an imaginary line through the points where each side channel tube feeds a slot die. More preferably, in the case of coextrusion of a first polymer and a second polymer, the bore for the axial rod heater will be located both near an imaginary line through the points where each side channel tube feeds a slot die, and also equidistant from the side channel tubes carrying the first polymer and the side channel tubes carrying the second polymer. Further, the axial rod heater is preferably of a type that can provide a temperature gradient or a multiplicity of discrete temperatures along its length, either by variation in electrical resistance along its length, or by multi-zone control, or by other means known in the art. Such a heater, used in conjunction with the plate-type heaters described above, the insulation described above, or both, provides superior temperature control and/or uniformity to traditional means. Such superior control over layer thickness and gradient layer thickness distribution is especially important in controlling the positions and profiles of reflection bands as described in U.S. patent applications Ser. No. 09/006,085 entitled "Optical Film with Sharpened Bandedge" and Ser. No. 09/006,591 entitled "Color Shifting Film," both filed Jan. 13, 1998 and the contents of which are incorporated herein by reference.

Shear rate is observed to affect viscosity and other rheological properties, such as elasticity. Flow stability sometimes appears to improve by matching the relative shape of the viscosity (or other Theological function) versus shear rate curves of the coextruded polymers. In other words, minimization of maximal mismatch between such curves may be an appropriate objective for flow stability. Thus, temperature differences at various stages in the flow can help to balance shear or other flow rate differences over the course of that flow.

The web is cast onto casting roll, sometimes referred to as a casting wheel or casting drum. The casting roll is preferably chilled to quench the web and begin the formation of a multilayer cast film. Preferably, casting is assisted by electrostatic pinning, the details of which are well-known in the art of polyester film manufacture. For the inventive optical films, care should be exercised in setting the parameters of the electrostatic pinning apparatus. Periodic cast web thickness variations along the extrusion direction of the film, frequently referred to as "pinning chatter," should be avoided to the extent possible. Adjustments to the current, voltage, pinning wire thickness, and pinning wire location with respect to the die and the casting chill roll are all known to have an affect, and should be set on a case-by case basis by one skilled in the art.

The web can sometimes attain a sidedness in surface texture, degree of crystallinity, or other properties due to wheel contact on one side and merely air contact on the other. This can be desirable in some applications and undesirable in others. When minimization of such sidedness differences is desired, a nip roll can be used in combination with the casting roll to enhance quenching or to provide smoothing onto what would otherwise be the air side of the cast web.

In some cases, it is important that one side of the multilayer stack be the side chosen for the superior quench that is attained on the chill roll side. For example, if the multilayer stack consists of a distribution of layer thicknesses, it is frequently desired to place the thinnest layers nearest the chill roll. This is discussed in detail in U.S. patent application Ser. No. 08/904,325, entitled "Method for Making Optical Films Having Thin Optical Layers," which is incorporated herein by reference.

In some cases, it is desired to provide the film with a surface roughness or surface texture to improve handling in winding and/or subsequent conversion and use. A specific example germane to the inventive optical films arises when they are intended for use in intimate contact with a glass plate or a second film. In such cases, selective "wetting out" of the optical film onto the plate or second film can result in the phenomenon known as "Newton's Rings," which damages the uniformity of the optics over large surface areas. A textured or rough surface prevents the intimacy of contact required for wetting out thereby minimizing or eliminating the appearance of Newton's Rings.

It is well known in the polyester film art to include small amounts of fine particulate materials, often referred to as "slip agents," to provide such surface roughness or texture. The use of slip agents can be incorporated into the inventive optical films. However, the inclusion of slip agent particulates can introduce a small amount of haze and can decrease the optical transmission of the film. In accordance with the present invention, Newton's Rings can be effectively prevented, without the use of slip agents, if surface roughness or texture is provided by contacting the cast web with a micro-embossing roll during film casting. Preferably, the micro-embossing roll will serve as a nip roll to the casting wheel. Alternatively, the casting wheel itself may be micro-textured to provide a similar effect. Further, both a micro-embossing casting wheel and a micro-embossing nip roll may be used together to provide a film that is micro-embossed on both sides.

Further, Applicants found that the use of a smooth nip roll at the casting roll, in addition to aiding quench at what would otherwise be the air side of the film, as already discussed above, can also significantly reduce the magnitude of die lines, pinning chatter, and other thickness fluctuations. The web may be cast to a uniform thickness across the web or a deliberate profiling of the web thickness may be induced using die lip controls. Such profiles may improve uniformity by the end of the film process. In other cases, a uniform cast thickness provides best uniformity at the end of the film process. Controlling vibrations in the process equipment is also important to reduce "chatter" in the cast multilayer web.

Residence times in the various process stages may also be important even at a fixed shear rate. For example, interdiffusion between layers can be altered and controlled by adjusting residence times. "Interdiffusion," as used in this document, refers to mingling and reactive processes between materials of the individual layers including, for example, various molecular motions such as normal diffusion, cross-linking reactions, or transesterification reactions. Sufficient interdiffusion is desirable to ensure good interlayer adhesion and prevent delamination. However, too much interdiffusion can lead to deleterious effects, such as the substantial loss of compositional distinctness between layers. Interdiffusion can also result in copolymerization or mixing between layers, which may reduce the ability of a layer to be oriented when drawn. The scale of residence time on which such deleterious interdiffusion occurs is often much larger (e.g., by an order of magnitude) than that required to achieve good interlayer adhesion, thus the residence time can be optimized. However, some large-scale interdiffusion may be useful in profiling the interlayer compositions, for example to make rugate structures.

The effects of interdiffusion can also be altered by further layer compression. Thus, the effect at a given residence time is also a function of the state of layer compression during that interval relative to the final layer compression ratio. As thinner layers are more susceptible to interdiffusion, they are typically placed closest to the casting wheel for maximal quenching.

Applicants also found that interdiffusion can be enhanced after the multilayer film has been cast, quenched, and drawn, via heat setting at an elevated temperature. Heat setting is normally done in the tenter oven in a zone subsequent to the transverse drawing zone. Normally, for polyester films, the heat setting temperature is chosen to maximize crystallization rate and optimize dimensional stability properties. This temperature is normally chosen to be between the glass transition and melting temperatures, and not very near either temperature. Selection of a heat set temperature closer to the melting point of the lowest-melting polymer among those polymers in the multilayer film which are desired to maintain orientation in the final state results in a marked improvement in interlayer adhesion. This is unexpected due to the short residence times involved in heat setting on line, and the non-molten nature of the polymers at this process stage. Further, while offline heat treatments of much longer duration are known to improve interlayer adhesion in multilayer films, these treatments also tend to degrade other properties, such as modulus or film flatness, which was not observed with on-line elevated-temperature heat setting treatments.

Conditions at the casting wheel are set according to the desired result. Quenching temperatures must be cold enough to limit haze when optical clarity is desired. For polyesters, typical casting temperatures range between 10° C. and 60° C. The higher portion of the range may be used in conjunction with smoothing or embossing rolls while the lower portion leads to more effective quenching of thick webs. The speed of the casting wheel may also be used to control quench and layer thickness. For example, the extruder pumping rates may be slowed to reduce shear rates or increase interdiffusion while the casting wheel is increased in speed to maintain the desired cast web thickness. The cast web thickness is chosen so that the final layer thickness distribution covers the desired spectral band at the end of all drawing with concomitant thickness reductions.

The multilayer web is drawn to produce the final multilayer optical film. A principal reason for drawing is to increase the optical power of the final optical stack by inducing birefringence in one or more of the material layers. Typically, at least one material becomes birefringent under draw. This birefringence results from the molecular orientation of the material under the chosen draw process. Often this birefringence greatly increases with the nucleation and growth of crystals induced by the stress or strain of the draw process (e.g. stress-induced crystallization). Crystallinity suppresses the molecular relaxation, which would inhibit the development of birefringence, and crystals may themselves also orient with the draw. Sometimes, some or all of the crystals may be pre-existing or induced by casting or pre-heating prior to draw. Other reasons to draw the optical film may include, but are not limited to, increasing throughput and improving the mechanical properties in the film.

In one typical method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this typical method, a film is drawn in one in-plane direction. The second in-plane dimension is either held constant as in a conventional tenter, or is allowed to neck into a smaller width as in a length orienter. Such necking in may be substantial and increases with draw ratio. For an elastic, incompressible web, the final width may be estimated theoretically as the reciprocal of the square root of the lengthwise draw ratio times the initial width. In this theoretical case, the thickness also decreases by this same proportion. In practice, such necking may produce somewhat wider than theoretical widths, in which case the thickness of the web may decrease to maintain approximate volume conservation. However, because volume is not necessarily conserved, deviations from this description are possible.

In one typical method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter, which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner. Such optical films and processes are described further in U.S. patent application Ser. No. 09/006,455 filed Jan. 13, 1998 entitled "An Optical Film and Process for Manufacture Thereof," the contents of which is incorporated by reference.

Drawing conditions for multilayer optical polarizer films are often chosen so that a first material becomes highly birefringent in-plane after draw. A birefringent material may be used as the second material. If the second material has the same sense of birefringence as the first (e.g. both materials are positively birefringent), then it is usually preferred to choose the second material so that is remains essentially isotropic. In other embodiments, the second material is chosen with a birefringence opposite in sense to the first material when drawn (e.g., if the first material is positively birefringent, the second material is negatively birefringent). For a positively birefringent first material, the direction of highest in-plane refractive index, the first in-plane direction, coincides with the draw direction, while the direction of lowest in-plane refractive index for the first material, the second in-plane direction, is perpendicular to the first direction. Similarly, for multilayer mirror films, a first material is chosen to have large out-of-plane birefringence, so that the in-plane refractive indices are both higher than the initial isotropic value in the case of a positively birefringent material (or lower in the case of a negatively birefringent material). In the mirror case, it is often preferred that the in-plane birefringence is small so that the reflections are similar for both polarization states, i.e. a balanced mirror. The second material for the mirror case is then chosen to be isotropic, or birefringent in the opposite sense, in similar fashion to the polarizer case.

In another embodiment of multilayer optical films, polarizers may be made via a biaxial process. In still another embodiment, balanced mirrors may be made by a process that creates two or more materials of significant in-plane birefringence and thus in-plane asymmetry such that the asymmetries match to form a balanced result, e.g. nearly equal refractive index differences in both principal in-plane directions.

In certain processes, rotation of these axes can occur due to the effects of process conditions including tension changes down web. This is sometimes referred to as "bow-forward" or "bow-back" in film made on conventional tenters. Uniform directionality of the optical axes is usually desirable for enhanced yield and performance. Processes that limit such bowing and rotation, such as tension control or isolation via mechanical or thermal methods, can be used.

Frequently, it is observed that drawing film transverse to the machine direction in a tenter is non-uniform, with thickness, orientation, or both changing as the film approaches the gripped edges of the web. Typically, these changes are consistent with the assumption of a cooler web temperature near the gripped edges than in the web center. The result of such non-uniformity can be a serious reduction in usable width of the finished film. This restriction can be even more severe for the optical films of the present invention, as very small differences in film thickness can result in non-uniformity of optical properties across the web. Drawing, thickness, and color uniformity, as Applicants recognize, can be improved by the use of infrared heaters to heat further the edges of the film web near the tenter grippers. Such infrared heaters can be used before the tenter's preheat zone, in the preheat zone, in the stretch zone, or in a combination of locations. One skilled in the art will appreciate the many options for zoning and controlling the addition of infrared heat. Further, the possibilities for combining infrared edge heating with changes in the cast web's cross-web thickness profile will also be apparent.

For certain of the inventive multilayer optical films, it is desirable to draw the film in such a way that one or more properties, measured on the finished films, have identical values in the machine and transverse directions. Such films are often referred to as "balanced" films. Machine- and transverse-direction balance can be achieved by selecting process conditions using techniques well known in the art of biaxially oriented film making. Typically, process parameters explored include machine-direction orientation preheat temperature, stretch temperature, and draw ratio, tenter preheat temperature, tenter stretch temperature, and tenter draw ratio, and, sometimes, parameters related to the post-stretching zones of the tenter. Other parameters may also be significant. Typically, designed experiments are performed and analyzed to arrive at appropriate combinations of conditions. Those skilled in the art will appreciate the need to perform such an assessment individually for each film construction and each film line on which it is to be made.

Similarly, parameters of dimensional stability (such as shrinkage at elevated temperature and reversible coefficient of thermal expansion) are affected by a variety of process conditions. Such parameters include, but are not limited to, heat set temperature, heat set duration, transverse direction dimensional relaxation ("toe-in") during heat set, web cooling, web tension, and heat "soaking" (or annealing) after winding into rolls. Again, designed experiments can be performed by one skilled in the art to determine optimum conditions for a given set of dimensional stability requirements, for a given film composition, and for a given film line.

In general, multilayer flow stability is achieved by matching or balancing the Theological properties, such as viscosity and elasticity, between the first and second materials to within a certain tolerance. The level of required tolerance or balance also depends on the materials selected for the PBL and skin layers. In many cases, it is desirable to use one or more of the optical stack materials individually in the various PBL or skin layers. For polyesters, the typical ratio between high and low viscosity materials is no more than 4:1, preferably no more than 2:1, and most preferably no more than 1.5:1 for the process conditions typical of feedblocks, multipliers, and dies. Using the lower viscosity optical stack material in the PBL and skin layers usually enhances flow stability. More latitude in the requirements for a second material to be used with a given first material is often gained by choosing additional materials for the PBL and skin layers. Often, the viscosity requirements of these third materials (PBL and skin layers) are then balanced with the effective average viscosities of the multilayer stack comprising the first and second materials. Typically, the viscosity of the PBL and skin layers should be lower than this stack average for maximal stability. If the process window of stability is large, higher viscosity materials can be used in these additional layers, for example, to prevent sticking to rollers downstream of casting in a length orienter.

Draw compatibility means that the second material can undergo the draw processing needed to achieve the desired birefringence in the first material without causing deleterious effects to the multilayer film, such as breakage, voiding, or stress whitening. These effects can cause undesired optical properties. Draw compatibility usually requires that the glass transition temperature of the second material be no more than about 40° C. higher than that of the first material. This limitation can be ameliorated (1) by very fast drawing rates that make the orientation process for the first material effective even at higher temperatures or (2) by crystallization or cross-linking phenomena that also enhance the orientation of the first material at such higher temperatures. Also, draw compatibility requires that the second material can achieve the desired optical state at the end of processing, whether this is an essentially isotropic state or a highly birefringent state.

In the case of a second material that is to remain isotropic after final processing, at least three methods of material selection and processing can be used to meet this second requirement for draw compatibility. First, the second material can be inherently non-birefringent. An example of an inherently non-birefringent material is poly methylmethacrylate because it remains optically isotropic (as measured by refractive index) even if there is substantial molecular orientation after drawing. Second, the second material can be chosen so as to remain unoriented at the draw conditions of the first material, even though it could be made birefringent if drawn under different conditions. Third, the second material can orient during the draw process provided it may lose the orientation so gained in a subsequent process, such as a heat-setting step. In the case of multiple drawing schemes in which the final desired film contains more than one highly birefringent material (e.g. a polarizer made in certain biaxial drawing schemes), draw compatibility may not require any of these methods. Alternatively, the third method may be applied to achieve isotropy after a given drawing step, or any of these methods may be used for third or further materials.

Draw conditions can also be chosen to take advantage of the different visco-elastic characteristics of the first and second optical materials, as well as any materials used in the skin and PBL layers, such that the first material becomes highly oriented during draw while the second remains unoriented or only slightly oriented after draw according to the second scheme described above. Visco-elasticity is a fundamental characteristic of polymers. The visco-elasticity characteristics of a polymer may be used to describe its tendency to react to strain like a viscous liquid or an elastic solid. At high temperatures and/or low strain rates, polymers tend to flow when drawn like a viscous liquid with little or no molecular orientation. At low temperatures and/or high strain rates, polymers tend to draw elastically like solids with concomitant molecular orientation. A low temperature process is typically considered take place near the polymeric material's glass transition temperature, while a high temperature process takes place substantially above the glass temperature.

Visco-elastic behavior is generally the result of the rate of molecular relaxation in a polymeric material. In general, molecular relaxation is the result of numerous molecular mechanisms, many of which are molecular weight dependent. Thus, polydisperse polymeric materials have a distribution of relaxation times, with each molecular weight fraction in the polydisperse polymer having its own longest relaxation time. The rate of molecular relaxation can be characterized by an average longest overall relaxation time (i.e., overall molecular rearrangement) or a distribution of such times. The precise numerical value for the average longest relaxation time for a given distribution is a function of how the various times in the distribution are weighted in the average. The average longest relaxation time typically increases with decreasing temperature and becomes very large near the glass transition temperature. The average longest relaxation time can also be increased by crystallization and/or crosslinking in the polymeric material which, for practical purposes, inhibits any relaxation under process times and temperatures typically used. Molecular weight and distribution, as well as chemical composition and structure (e.g., branching), can also effect the longest relaxation time.

The choice of resin strongly effects the characteristic relaxation time. Average molecular weight, MW, is a particularly significant factor. For a given composition, the characteristic time tends to increase as a function of molecular weight (typically as the 3 to 3.5 power of molecular weight) for polymers whose molecular weight is well above the entanglement threshold. For unentangled polymers, the characteristic time tends to increase as a weaker function of molecular weight. Because polymers below this threshold tend to be brittle when below their glass transition temperatures and are usually undesirable, they are not the principal focus here. However, certain lower molecular materials may be used in combination with layers of higher molecular weight as could low molecular weight rubbery materials above the glass transition, e.g. an elastomeric or tacky layer. Inherent or intrinsic viscosity, IV, rather than average molecular weight, is usually measured in practice. The IV varies as $MW^\alpha$ where $\alpha$ is the solvent dependent Mark-Houwink exponent. The exponent $\alpha$ increases with solubility of the polymer. Typical values of $\alpha$ might be 0.62 for PEN (polyethylene naphthalate) and 0.68 for PET (polyethylene terephthalate), both measured in solutions of 60:40 Phenol:ortho-Dichlorobenzene, with intermediate values for a copolymer of the two (e.g., coPEN). PBT (polybutylene terephthalate) would be expected to have a still larger value of $\alpha$ than PET, as would polyesters of longer alkane glycols (e.g. hexane diol) assuming improved solubility in the chosen solvent. For a given polymer, better solvents would have higher exponents than those quoted here. Thus, the characteristic time is expected to vary as a power law with IV, with its power exponent between $3/\alpha$ and $3.5/\alpha$. For example, a 20% increase in IV of a PEN resin is expected to increase the effective characteristic time. Thus the Weissenberg Number (as defined below) and the effective strength of the drawing flow, at a given process temperature and strain rate by a factor of approximately 2.4 to 2.8. Since a lower IV resin will experience a weaker flow, relatively lower IV resins are preferred in the present invention for the case of a second polymer of desired low final birefringence, and higher IV resins are preferable for the stronger flows required of the first polymer of high birefringence. The limits of practice are determined by brittleness on the low IV end and by the need to have adequate rheological compatibility during the coextrusion. In other embodiments, in which strong flows and high birefringence are desired in both a first and second material, higher IV may be desired for both materials. Other processing considerations, such as upstream pressure drops as might be found in the melt stream filters, can also become important.

The severity of a strain rate profile can be characterized in a first approximation by a Weissenberg number (Ws) which is the product of the strain rate and the average longest relaxation time for a given material. The threshold Ws value between weak and strong draw (below which, and above which, the material remains isotropic or experiences strong orientation, crystallization and high birefringence, respectively) depends on the exact definition of this average longest relaxation time as an average of the longest relaxation times in the polydisperse polymeric material. It will be appreciated that the response of a given material can be altered by controlling the drawing temperature, rate and ratio of the process. A process which occurs in a short enough time and/or at a cold enough temperature to induce substantial molecular orientation is an orienting or strong draw process. A process which occurs over a long enough period and/or at hot enough temperatures such that little or no molecular orientation occurs is a non-orienting or weak process.

Another critical issue is the duration of the draw process. Strong draw processes typically need enough duration (that is, a high enough draw ratio) to accomplish sufficient orientation, e.g. to exceed the threshold for strain-induced crystallization, thereby achieving high birefringence in the first material. Thus, the strain rate history profile, which is the collection of the instantaneous strain rates over the course of the drawing sequence, is a key element of the draw process. The accumulation of the instantaneous strain rates over the entire draw process determines the final draw ratio. The temperature and strain rate draw profile history determine the draw ratio at which the first polymer experiences the onset of strain-induced crystallization, given the characteristic time and supercooling of that polymer. Typically, the onset draw ratio decreases with increasing Ws. For PET, experimental evidence suggests this onset draw ratio has a limit between 1.5 and 2 at very high rates of strain. At lower rates of strain, the onset draw ratio for PET can be over 3. The final level of orientation often correlates with the ratio of the final draw ratio to the onset draw ratio.

Temperature has a major effect on the characteristic average longest relaxation time of the material, and is thus a major factor in determining whether a given material experiences a weak or strong flow. The dependence of the characteristic time on temperature can be quantified by the well known WLF equation [See. J. D. Ferry, Viscoelastic Properties of Polymers, John Wiley & Sons, New York, 1970]. This equation contains three parameters, $c_1$, $c_2$ and $T_0$. Often, $T_0$ is associated with the glass transition temperature, $T_g$. Using the approximate "universal" values for $c_1$ and $c_2$, applicable as a first estimate for many polymers, the WLF equation shows the large dependence on relaxation times with temperature. For example, using a relaxation time at 5° C. higher than the $T_g$ as a value for comparison, the relaxation times at 10° C., 15° C., and 20° C. higher than $T_g$ are approximately 20, 250 and 2000 times shorter, respectively. Greater accuracy for WLF parameters can be obtained by using empirical curve fitting techniques for a particular class of polymers, e.g. polyesters. Thus, to a first approximation, the single most important parameter for temperature effects on the characteristic time is $T_g$. The larger the temperature difference between the web temperature and $T_g$, the smaller the characteristic time and thus the weaker the draw flow. Further, it is reiterated that this discussion is most pertinent to the draw process prior to crystallization, especially strain induced crystallization. After crystallization occurs, the presence of crystals can further retard relaxation times and convert otherwise weak flows to strong flows.

By selecting the materials and process conditions in consideration of the orienting/non-orienting response of the materials, a film can be constructed such that the first material is oriented and birefringent and the second material is essentially unoriented. That is, the process is a strong draw process for the first material and a weak draw process for the second material. As an example of strong and weak flows, let us consider PEN of approximately 0.48 IV, an initial draw rate of about 15% per second, and a uniaxial draw profile that increases the draw ratio in a linear manner to a final draw ratio of 6.0. At a web temperature of about 155° C., PEN experiences weak flow that leaves it in a state of low birefringence. At 135° C., PEN experiences a strong flow that makes it highly birefringent. The degree of orientation and crystallization increases in this strong flow regime as the temperature drops further. These values are for illustration only and should not be taken as the limiting values of these regimes.

More general ranges for material selection can be understood by considering the more general case of polyesters. For PET, approximate values for the WLF parameters can be taken as $c_1=11.5$, $c_2=55.2$ and $T_0=T_g+4°$ C.$=80°$ C. These values are for purposes of illustration only, it being understood that empirical determination of these constants may give somewhat varying results. For example, alternate values using the "universal" values of $c_1=17.7$ and $c_2=51.6$, and using $T_0=85°$ C., have been proposed. At a temperature 20° C. above the glass transition, the effect of a 5° C. increase/decrease in temperature is to decrease/increase the characteristic time and Ws by a factor of four. At 10° C. above the glass transition, the effect is much stronger, about a factor of ten. For PEN, $T_0$ is estimated as approximately 127° C. For DMI-based polyester (e.g. PEI), $T_0$ is estimated as about 64° C. The glass transition of polyester with some higher alkane glycol such as hexane diol might be expected, based on these example WLF values, to have a 1° C. decrease in glass transition for every 1% replacement of ethylene glycol. For coPEN, the glass transition can be estimated using the so-called Fox equation. The reciprocal of the coPEN glass transition temperature (in absolute degrees) is equal to the linear, compositionally weighted average of its component reciprocal glass transition temperatures (in absolute degrees). Therefore, a coPEN of 70% naphthalene dicarboxylate (NDC) and 30% dimethylterephthalate (DMT) would have an estimated glass transition of about 107° C., assuming glass transitions for PEN and PET of 123° C. and 76° C., respectively. Likewise, a coPEN of 70% NDC and 30% DMI would have a glass transition of about 102° C. Roughly, the latter coPEN would be expected to experience a weak flow at a temperature 20° C. lower than that required for weak flow for PEN, under the same conditions. Thus, at web temperatures of 135° C., coPEN is weakly oriented and PEN is strongly oriented under the process conditions cited. This particular choice of resins has been previously cited as one example of a preferred embodiment for multilayer reflective polarizers in WO 95/17303.

The temperature effects the strength of the flow secondarily by altering the rate of nucleation and crystal growth. In the undrawn state, there is a temperature of maximum crystallization rate. Rates are slowed below this temperature due to much slower molecular motions as characterized by the relaxation times. Above this temperature, the rates are slowed by the decrease in the degree of supercooling (the melting temperature minus the process temperature), which is related to the thermodynamic driving force for crystallization. If the draw is fast and the temperature is near $T_g$, the onset of strain induced crystallization may be enhanced (making the draw still stronger) by raising the temperature, because little additional relaxation occurs at the higher temperature but nucleation and growth can be accelerated. If the temperature of draw is near the melting point, raising the draw temperature and thus decreasing the degree of supercooling may decrease the rate of strain-induced crystallization, delaying the onset of such crystallization and thereby making the flow effectively weaker. A material can be deliberately designed to have a low melting point and thus little or no supercooling. Copolymers are known to have a reduced melting point due to the impurity effect of the additional monomer. This can be used effectively to maintain the second polymer in a state of low orientation.

The aforementioned effect of melting point can also be used to accomplish the third method for obtaining draw compatibility in the case of a second material with desired isotropy. Alternatively, this may be used after a drawing step during a multiple drawing process to achieve isotropy in one or more of the materials. Drawing processes that are strong for both the first and second material may be used as long as the effects of that draw can be eliminated in the second polymer in a subsequent step. For example, a heat setting step can be used to accomplish relaxation of an oriented, but still amorphous, second polymer. Likewise, a heat setting step can be used to melt an oriented and crystallized second polymer, as long as it is adequately quenched.

Heat setting can also be useful in improving other properties, such as dimensional stability (with regard to both temperature and humidity) and interlayer adhesion. Finally, tension conditions at quenching, prior to winding, can also affect physical properties, such as shrinkage. Reduced winding tension and reduced cross web tension via a toe in (reduction in transverse draw ratio) can reduce shrinkage in a variety of multilayer optical films. Post-winding heat treatment of film rolls can also be used to improve dimensional stability and reduce shrinkage.

In general, the birefringence of a polymer experiencing a strong flow deformation tends to increase with the draw ratio. Because of strain-induced crystallization, for a given draw process there may be a critical draw ratio at which this birefringence begins to increase more dramatically. After onset of crystallization, the slope may again change (e.g. drop) due to changes in the relative amount of continued nucleation and growth with further drawing. For the inventive multilayer optical films, the increase in the birefringence of at least one of the polymers leads to an increase in the reflection of light of wavelengths appropriate to the layer thicknesses of the multilayer stack. This reflective power also tends to increase in relative measure to the orientation.

On the other hand, adhesion between layers in the multilayer stack is often adversely affected by drawing, with stretched films frequently being much more prone to exfoliation of layers than the cast webs from which they were made. Surprisingly, this decrease in interlayer adhesion, as discovered by the present inventors, may also experience a critical point under some process/material combinations so that the majority of the decrease happens relatively abruptly as a specific draw ratio is exceeded. This critical change need not correlate with changes in the birefringence. In other cases, the behavior can be non-linear but not necessarily abrupt. The existence and value of this critical draw ratio is likely a complex function of the polymers involved and a host of other process conditions, and needs to be determined on a case-by-case basis. The compromise between high optical extinction and high interlayer adhesion with respect to draw ratio will be dominated by the existence and location of an abrupt transition or other functional form, e.g., with the optimal draw ratio for a given film likely to be selected from the maximum possible draw ratio and the draw ratio just below the abrupt interlayer adhesion transition.

There are other process compromises that may be apparent for particular resin system choices. For instance, in certain systems, higher draw ratio may also result in higher off-angle color. Increased off-angle color can result from an increase in the z-index (the out-of-plane index) interlayer mismatch due to the lowering of the z-index of refraction of the first material (such as PEN), while the second material z-index remains nearly constant. The drop in z-indices in aromatic polyesters may be related to the planarization of the crystals within the film, which causes the planes of the aromatic rings to tend to lie in the plane of the film. Such compromises may sometimes be avoided by altering the selection of resin pairs. For example, reducing the level of crystallinity while maintaining a given level of orientation may improve both interlayer adhesion and off-angle color without reducing extinction power, as long as the difference between the refractive index of the in-plane draw direction and the in-plane non-drawn direction remains about the same. This latter condition can be met by using high NDC content coPENs as the first polymer. The lower melting points of these polymers suggest that lower levels of crystallinity would be obtained at the same level of orientation, allowing extinction to be maintained while decreasing off-angle color and possibly increasing interlayer adhesion. It will be appreciated that similar process considerations would pertain to additional materials, such as those to be used in the skin and/or PBLs. If these materials are to be isotropic, thus avoiding polarization retardation from thick birefringent layers, they should be chosen in accord with the requirements of a second polymer with desired isotropy.

Finally, the need for careful control and uniformity of process conditions should be appreciated to form high quality optical films in accordance with the present invention. Draw uniformity is strongly influenced by temperature, and thus uniform temperature is typically desired for a uniform film. Likewise, caliper (thickness) and compositional uniformity is also desirable. One preferred method to obtain uniformity is to cast a flat uniform film, which is then uniformly drawn to make a uniform final film. Often, final film properties are more uniform (in off-angle color, for example) and better (e.g. interlayer adhesion) under such processes. Under certain circumstances, cast thickness profiling can be used to compensate for uneven drawing to produce a final film of uniform caliper. In addition, infrared edge heating, discussed above, can be used in conjunction with cast thickness profiling.

Film Uniformity

The high quality multilayer optical films and other optical devices made in accordance with the present invention can be made so as to exhibit a degree of physical and optical uniformity over a large area that far exceeds that accessible with prior art films. In accordance with the method of the invention, the distortions of layer thickness and optical caliper encountered in prior art cast (not drawn) films is avoided by biaxially stretching the cast web by a factor of between about 2×2 and about 6×6, and preferably about 4×4. These ranges tend to make the lateral layer thickness variations, and therefore the color variations, much less abrupt. Furthermore, because the film is made by stretching a cast web (as opposed to casting a finished film directly without stretching), the narrower the cast web width, the fewer the distortions in layer thickness distribution in the extrusion die because of significantly less layer spreading occurring in the narrower die.

Many other process considerations discussed in the sections above and intended to improve layer thickness uniformity also improve the color uniformity, as color depends directly on layer thickness. These include, but are not limited to, multilayer resin system rheological matching, filtration, feedblock design, multiplier design, die design, PBL and skin layer selection, temperature control, electrostatic pinning parameters, use of web thickness variation scanning devices, use of a casting nip roll, vibration control, and web edge heating in the tenter.

Errors in extrusion equipment design and machining, and in the extrusion control, will lead to both systematic and random thickness errors. For uniform color films in general, the random errors can lead to both down web and cross web variations in color, and the systematic errors, although not changing, will affect both the overall color of the film and the crossweb color variation.

Both random and systematic errors can occur for the overall film caliper as well as for individual layers. Overall film caliper errors are most easily detected and monitored via the optical transmission or reflectance spectra. Thus, an on-line spectrophotometer can be set up to measure the spectral transmission of the film as it comes off the line, thereby providing the necessary information to measure color uniformity and provide feedback for process controls. Individual layer errors may or may not affect the perceived color, depending mostly on where they are in the optical stack and on the magnitude of the errors.

Systematic errors are repeatable deviations from the design thickness for any or all layers in the stack. They can occur because of design approximations inherent in the polymer flow model used to design the multipliers and feedblock, or because of machining errors in the feedblock and die. These errors can be eliminated by redesign and re-machining until the errors are reduced to design criteria. These errors can also be reduced by machining a feedblock that will produce the required number of layers in the optical film without resort to a multiplier.

Random errors can be caused by: (1) fluctuations in feedblock and die zone temperatures, (2) resin nonhomogeneity, (3) improper control of melt temperatures through the melt train, which selectively degrade parts of the melt stream, (4) contamination of the feedblock or die due to degraded resin, (5) process control errors such as melt pressure, temperature and pumping rate variations, and (6) hydrodynamic flow instabilities. The flow modeling should provide input to the feedblock and die designs in order to avoid conditions that could cause such flow instabilities.

Overall thickness uniformity is affected by die design, casting wheel speed fluctuations, system vibrations, die gap control, electrostatic pinning, and film stretching conditions. These variations can be either random or systematic. Systematic errors do not necessarily give a constant (e.g., unchanging) color. For example, vibrations of the die or casting wheel can cause a repeating spatial color variation with a periodicity on the order of 0.5 to 50 cm. In certain applications such as decorative film, where a periodic spatial color variation may be desirable in the finished film, controlled periodic vibrations may be intentionally imparted to the casting wheel. However, where color uniformity is desired and good thickness control is essential, the casting wheel is fitted with a direct drive motor (e.g., no gear reduction). One example of such a motor is a D.C. brush servo motor, such as part number TT-10051A, available commercially from Kollmorgan. Higher speed motors with gear reduction can be used, but a high quality system with proper electrical tuning and a smooth gearbox is essential. System vibrations, particularly of the die relative to the casting wheel, can be minimized by placing the casting station on concrete pads on the ground floor of the casting installation. Other means of dampening or isolation will be apparent to one skilled in the mechanical arts.

The sources of vibrations can be identified with the help of a web thickness variation scanning device discussed earlier. If the period of an oscillation can be identified from the output of such a device, a search may be made for process elements, or even extraneous sources, which exhibit oscillatory behavior of identical period. These units can then be made more rigid, vibration-damped, or vibration-isolated from the die and casting wheel by methods known in the art, or may simply be turned off or relocated if not essential to the process. Hence, a vibration identified by periodicity as being due to the rotation of the extruder screw could be isolated, for example, by the use of a damping material between the extruder gate and the neck tube, while a vibration identified by periodicity as being due to a room fan could be removed by turning off or relocating the fan. In addition, a vibration of the die or casting station which cannot be totally eliminated can be prevented from resulting in vibratory relative motion between the die and casting station by mechanically linking the die to the casting station via some form of rigid superstructure. Many designs for such a vibration-communicating mechanical linkage will be apparent. Furthermore, when strain hardening materials are employed in the film, stretching should be performed at sufficiently low temperatures to produce a uniform stretch across the web, and the pinning wire should be rigidly mounted.

Additional control over layer thickness and optical caliper is achieved through the use of a precision casting wheel drive mechanism having a constant rotation speed. The casting wheel is designed and operated such that it is free of vibrations that would otherwise cause web thickness "chatter" and subsequent layer thickness variations in the down-web direction. Applicants have found that those vibrations which produce a relative motion between the die and casting wheel result in effective speed variations in the casting wheel as it draws out the extrudate coming from the die. These speed variations cause modulations in film caliper and optical layer thickness that are particularly pronounced in the strain-hardening materials advantageously employed in making the optical films of the present invention, resulting in color variations across the surface of the film. Accordingly, absent these controls at the casting wheel, the normal vibrations encountered in the extrusion process are sufficient to noticeably diminish color uniformity in the optical films of the present invention. The methods of the present invention have allowed the production, for the first time, of color shifting films made from polymeric materials that have a high degree of color uniformity at any particular viewing angle. Thus, films may be made in accordance with the method of the present invention in which the desired bandwidth of light transmitted or reflected at a particular angle of incidence varies by less than about 1 or 2 nm over an area of at least 10 $cm^2$, and more preferably, at least 100 $cm^2$, and in which the absolute bandedges of the spectral reflectance peaks vary in wavelength by less than about +/−4 nm.

While thickness and/or color uniformity is important in many applications of the films of the present invention, in other applications, such as decorative films, color uniformity may be either unimportant or undesirable. In applications where color variations are desirable, they may be intentionally imparted to the inventive optical films by inducing thickness variations of a desired spatial frequency across or along a portion of the web at any point prior to quenching of the web in such a manner as to result in modulations in the thickness of the optical stack. While there are numerous ways of accomplishing this effect (e.g., by inducing vibrations in the casting wheel), such modulations may be conveniently imparted by inducing vibrations of a desired frequency (or frequencies) in the pinning wire. For example, by inducing a vibration on the pinning wire, the color of a polarizer film was periodically varied, in straight lines across the film, from a neutral gray transmission color to a red color. The red stripes were 6.0 mm apart in the down-web direction. Calculated frequency of the pinning wire vibration was 21 Hz.

Local random color variations can also be achieved by extruding films of the present invention with small internal bubbles to produce attractive decorative effects. Bubbles can be created by several methods including not drying the resin as sufficiently as one would normally do, or by slightly overheating a thermally sensitive resin such as PMMA to create a similar effect. The small bubbles formed locally distort the microlayers and cause a local color change that can give the appearance of depth in some instances.

Although the methods described above for inducing color variations appear to teach a nonuniform film, the starting base film having uniform color with high stop band reflectivity and high color saturation, although locally disrupted by a given method, may be desirable in controlling the average hue, color saturation, and brightness of such a decorative film. The local color variations taught here are more noticeable when applied to a uniform color shifting film having reflection bands with inherently high reflectivity and bandedges with high slopes.

As noted above, vibrations in the casting wheel cause the speed of the casting wheel to fluctuate, resulting in variations of layer thicknesses in the film. The frequency (or frequencies) of the vibrations can be modulated to impart repeating sequences or patterns of colors to the resulting film. Furthermore, these color variations can be accomplished without destroying the color shifting characteristics typical of the films of the present invention, thereby allowing the production of colorful films (often spanning the entire visible spectrum) in which the colors appear to shimmer or move as the angle of incidence is varied Periodic color variations may also be imparted to the film by embossing it with a pattern. Due in part to the fact that the embossed portion is no longer coplanar with the rest of the film, it will exhibit a different color or colors than the rest of the film. Thus, striking effects have been produced by embossing the color shifting films of the present invention with, for example, a fishnet pattern (e.g., gold on a red background) or an emblem.

In certain instances, similar principles may be used to remove or tune out periodic color variations in the film, thereby improving the color uniformity of the film. Thus, where a source is found to impart vibrations of a given frequency or a given periodic frequency to the web, vibrations of equal amplitude (but opposite phase) can be imparted to the web (e.g., through the casting wheel), resulting in destructive interference and effective removal of the source from the process.

Additional layers and coatings

As further steps in the process of making the high quality coextruded polymeric multilayer optical films of the present invention, various layers or coatings may be applied to at least a portion of one or both sides of the multilayer optical stack to modify or enhance the physical, chemical, or optical characteristics of the film. These layers or coatings may be integrated at the time of film formation, either by coextrusion or in a separate coating or extrusion step, or they may be applied to the finished optical film at a later time. Examples of additional layers or coatings are described in U.S. patent application Ser. No. 08/910,660 filed Aug. 13, 1997 entitled "Multilayer Polymer Film with Additional Coatings or Layers" which is incorporated herein by reference. A non-limiting listing of coatings or layers that may be combined with the coextruded multilayer film is described in more detail in the following examples.

A non-optical layer of material may be coextensively disposed on one or both major surfaces of the film, i.e., the extruded optical stack. The composition of the layer, also called a skin layer, may be chosen, for example, to protect the integrity of the optical layers, to add mechanical or physical properties to the final film or to add optical functionality to the final film. Suitable materials of choice may include the material of one or more of the optical layers. Other materials with a melt viscosity similar to the extruded optical layers may also be useful. It should also be noted that many of the mechanical advantages derived from skin layers can also be derived from an analogous internal thick non-optical layer, e.g. a PBL.

A skin layer or layers may reduce the wide range of shear intensities the extruded multilayer stack might experience within the extrusion process, particularly at the die. A high shear environment may cause undesirable deformations in the optical layers. A skin layer or layers may also add physical strength to the resulting composite or reduce problems during processing, such as, for example, reducing the tendency for the film to split during the orientation process. Skin layer materials that remain amorphous can result in films having a higher toughness, while skin layer materials that are semicrystalline can result in films having a higher tensile modulus. Other functional components such as anti-static additives, UV absorbers, dyes, antioxidants, and pigments, may be added to the skin layer, provided they do not substantially interfere with the desired optical properties of the resulting product. Skin layers or coating may also be used to aid in post-extrusion processing; for example, by preventing sticking of the film to hot rollers or tenter clips.

Skin layers or coatings may also be added to impart desired barrier properties to the resulting film or device. Thus, for example, barrier films or coatings may be added as skin layers, or as a component in skin layers, to alter the transmissive properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film. Such a skin layer, however, should not unduly compromise the optical properties required for the application to which the film is directed.

Skin layers or coatings may also be added to impart or improve puncture and/or tear resistance in the resulting article. Thus, for example, in embodiments in which the outer layer of the optical film contains coPEN, a skin layer of monolithic coPEN may be coextruded with the optical layers to impart good tear resistance to the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical film. Adhering these layers to the optical film during the manufacturing process, such as by a coextrusion process, provides the advantage that the optical film is protected during the manufacturing process. In some embodiments, one or more puncture or tear resistant layers may be provided within the optical film, either alone or in combination with a puncture or tear resistant skin layer.

The skin layers may be applied to one or two sides of the extruded optical stack at some point during the extrusion process, i.e., before the extruded and skin layer(s) exit the extrusion die. This may be accomplished using conventional coextrusion technology, which may include using a three-layer coextrusion die. Lamination of skin layer(s) to a previously formed multilayer film is also possible. Total skin layer thicknesses may range from about 2% to about 50% of the total optical stack/skin layer thickness.

In some applications, additional layers may be coextruded or adhered on the outside of the skin layers during manufacture of the optical films. Such additional layers may also be extruded or coated onto the optical film in a separate coating operation, or may be laminated to the optical film as a separate film, foil, or rigid or semi-rigid substrate such as polyester (PET), acrylic (PMMA), polycarbonate, metal, or glass.

Many polymers are suitable for skin layers. Of the predominantly amorphous polymers, suitable examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials. Skin layers that may be used to increase the toughness of the optical film include high elongation polyesters such as ECDEL™ and PCTG 5445 (available commercially from Eastman Chemical Co., Rochester, N.Y.) and polycarbonates. Polyolefins, such as polypropylene and polyethylene, may also be used for this purpose, especially if they are made to adhere to the optical film with a compatibilizer.

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or device.

The optical films of the present invention may comprise a slip agent that is incorporated into the film or added as a separate coating in order to improve roll formation and convertibility of the film. In most applications, slip agents will be added to only one side of the film, ideally the side facing the rigid substrate in order to minimize haze. The films and optical devices of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. Ser. No. 08/612,710.

The films and other optical devices made in accordance with the invention may also be provided with one or more adhesives to laminate the optical films and devices of the present invention to another film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above. Additionally, the adhesives can contain additives such as tackifiers, plasticizers, fillers, antioxidants, stabilizers, pigments, diffusing particles, curatives, and solvents. In some applications, as where the optical films of the present invention are to be used as a component in adhesive tapes, it may be desirable to treat the films with low adhesion backsize (LAB) coatings or films such as those based on urethane, silicone or fluorocarbon chemistry. Films treated in this manner will exhibit proper release properties towards pressure sensitive adhesives (PSAs), thereby enabling them to be treated with adhesive and wound into rolls Adhesive tapes, sheets, or die-cuts made in this manner can be used for decorative purposes or in any application where a diffusely reflective or transmissive surface on the tape is desirable. When a laminating adhesive is used to adhere an optical film of the present invention to another surface, the adhesive composition and thickness are preferably selected so as not to interfere with the optical properties of the optical film. For example, when laminating additional layers to an optical polarizer or mirror wherein a high degree of transmission is desired, the laminating adhesive should be optically clear in the wavelength region that the polarizer or mirror is designed to be transparent in.

The films and optical devices of the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The films and optical devices of the present invention may also be provided with antistatic coatings or films. Such coatings or films include, for example, $V_2O_5$ and salts of sulfonic acid polymers, carbon or other conductive metal layers.

The optical films and devices of the present invention may also be provided with one or more barrier films or coatings that alter the transmissive properties of the optical film towards certain liquids or gases. Thus, for example, the devices and films of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

The optical films and devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The optical films and devices of the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N3300, available from Miles, Inc., Pittsburgh, Pa.) with a polyester (e.g., Tone Polyol 0305, available from Union Carbide, Houston, Tex.).

The optical films and devices of the present invention may further be laminated to rigid or semi-rigid substrates, such as, for example, glass, metal, acrylic, polyester, and other polymer backings to provide structural rigidity, weatherability, or easier handling. For example, the optical films of the present invention may be laminated to a thin acrylic or metal backing so that it can be stamped or otherwise formed and maintained in a desired shape. For some applications, such as when the optical film is applied to other breakable backings, an additional layer comprising PET film or puncture-tear resistant film may be used. Additionally, for some applications such as in liquid crystal displays, the multilayer optical film may be combined with a light redirecting structure as described in U.S. patent application Ser. No. 08/402,349 filed Mar. 10, 1995. Such a light redirecting structure coated onto the multilayer optical film, laminated as a separated film, cast and cured on a multilayer optical film substrate, or embossed directly onto the surface of the multilayer optical film.

The optical films and devices of the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the films and other optical devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors. Multiple additional layers on one or both major surfaces of the optical film are contemplated, and can be any combination of aforementioned coatings or films. For example, when an adhesive is applied to the optical film, the adhesive may contain a white pigment such as titanium dioxide to increase the overall reflectivity, or it may be optically transparent to allow the reflectivity of the substrate to add to the reflectivity of the optical film.

The films and other optical devices made in accordance with the invention may include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV™, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching. In some embodiments of the present invention, it is desired to maximize the transmission and/or minimize the specular reflection for certain polarizations of light. In these embodiments, the optical body may comprise two or more layers in which at least one layer comprises an anti-reflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective stack, graded index layers, and graded density layers. Such anti-reflection functions can also be used on the transmitted light side of the body to increase transmitted light if desired.

The films and other optical devices made in accordance with the invention may also be provided with a film or coating which imparts anti-fogging properties. In some cases, an anti-reflection layer as described above will serve the dual purpose of imparting both anti-reflection and anti-fogging properties to the film or device. Various anti-fogging agents are known to the art which are suitable for use with the present invention. Typically, however, these materials will substances, such as fatty acid esters, which impart hydrophobic properties to the film surface and which promote the formation of a continuous, less opaque film of water. Several inventors have reported coatings that reduce the tendency for surfaces to "fog". For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. World Patent No. PCT 96/18,691 (Scholtz et al) discloses means by which coatings may impart both anti-fog and anti-reflective properties.

The films and optical devices of the present invention may also be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings will be particularly important when the optical films and devices of the present invention are used in outdoor applications or in luminaires where the source emits significant amount of light in the UV region of the spectrum.

The films and optical devices of the present invention may also include antioxidants such as, for example, 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis(2,4-di-t-butylphenyl) pentaerythritol diphosphite, Irganox™ 1093 (1979)(((3,5-bis(1,1-dimethylethyl)-4-hydroxyphenyl)methyl)-dioctadecyl ester phosphonic acid), Irganox™ 1098 (N,N'-1,6-hexanediylbis(3,5-bis(1,1-dimethyl)-4-hydroxy-benzenepropanamide), Naugaard™ 445 (aryl amine), Irganox™ 57 (alkylated diphenylamine), Irganox™ L 115 (sulfur containing bisphenol), Irganox™ LO 6 (alkylated phenyl-delta-napthylamine), Ethanox 398 (flourophosphonite), and 2,2'-ethylidenebis(4,6-di-t-butylphenyl)fluorophosnite. A group of antioxidants that are especially preferred are sterically hindered phenols, including butylated hydroxytoluene (BHT), Vitamin E (di-alpha-tocopherol), Irganox™ 1425WL (calcium bis-(O-ethyl(3,5-di-t-butyl-4-hydroxybenzyl))phosphonate), Irganox™ 1010 (tetrakis(methylene(3,5,di-t-butyl-4- hydroxyhydrocinnamate))methane), Irganox™ 1076 (octadecyl 3,5-di-tert-butyl-4-hydroxyhydrocinnamate), Ethanox™ 702 (hindered bis phenolic), Ethanox 330 (high molecular weight hindered phenolic), and Ethanox™ 703 (hindered phenolic amine).

The films and optical devices of the present invention may also be treated with inks, dyes, or pigments to alter their appearance or to customize them for specific applications. Thus, for example, the films may be treated with inks or other printed indicia such as those used to display product identification, advertisements, warnings, decoration, or other information. Various techniques can be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems. The appearance of the optical film or other optical device may also be altered by coloring the device such as by laminating a dyed film to the optical device, applying a pigmented coating to the surface of the optical device, or including a pigment in one or more of the materials used to make the optical device. Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of the optical film, or may be a component of a second film or foil construction that is laminated to the optical film. Alternately, some components such as opacifying or diffusing agents, or colored pigments, may be included in an adhesive layer which is used to laminate the optical film to another surface.

The films and devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the optical films and devices of the present invention.

Dichroic dyes are a particularly useful additive for many of the applications to which the films and optical devices of the present invention are directed, due to their ability to absorb light of a particular polarization when they are molecularly aligned within the material. When used in a film or other optical body, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN. Still other dichroic dyes, and methods of making them, are discussed in the Kirk Othmer Encyclopedia of Chemical Technology, Vol. 8, pp. 652–661 (4th Ed. 1993), and in the references cited therein. Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light. Combinations of a dichroic dye with a multilayer optical polarizer are described in U.S. patent applications Ser. No. 08/402,042 entitled "Optical Polarizer" filed Mar. 10, 1995; in Ser. No. 09/006,458 entitled "Dichroic Polarizing Film and Optical Polarizers Containing the Film" filed Jan. 13, 1998; and in Ser. No. 09/006,468 entitled "Optical Device with a Dichroic Polarizer and a Multilayer Optical Film" filed Jan. 13, 1998.

In addition to the films, coatings, and additives noted above, the optical materials of the present invention may also comprise other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

The films and other optical devices made in accordance with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

For some applications, it may also be desirable to provide the films and other optical devices of the present invention one or more layers having continuous and disperse phases in which the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the specular optics of the optical stack to produce desirable optical properties in the resulting film.

Converting

Various lubricants may also be used during the processing (e.g., extrusion) of the films. Suitable lubricants for use in the present invention include calcium stearate, zinc stearate, copper stearate, cobalt stearate, molybdenum neodocanoate, and ruthenium (III) acetylacetonate. In addition, the film may undergo subsequent processing steps such as converting, wherein the film may be slit into rolls or finished sheets for a particular use, or the film may be slit or converted into strips, fibers, or flakes such as are used for glitter. Depending on the end-use application, additional coatings or layers as described above may be added either prior to or after a converting operation.

The multilayer optical films made according to the present invention may be converted into glitter in any of a variety of desired shapes and sizes (including copyrightable material or a trademark, e.g. movie or TV characters), including a registerable trademark or registered copyright as defined under the laws of the countries, territories, etc. of the world (including those of the United States). The periphery of the glitter may be, for example, a regular, predetermined shape (e.g., circles, squares, rectangles, diamonds, stars, or alphanumerics, other polygons (e.g., hexagons)), or an irregular random shape and mixtures of at least two different shapes and/or sizes. The size and shape of the glitter is typically chosen to optimize the appearance of the glitter or to suit a particular end use application. Typically, at least a portion of the glitter has particle sizes (i.e., maximum particle dimension) less than about 10 mm; more typically less than about 3 mm. In another aspect, at least a portion of the glitter typically has particle sizes ranging from about 50 micrometers to about 3 mm; preferably from about 100 micrometers to about 3 mm. Conversion of the film into regular, predetermined shapes is typically done using precision cutting techniques (e.g., rotary die cutting). Conversion services are commercially available, for example, from Glitterex Corporation, Belleville, N.J.

The thickness of the multilayer optical film comprising glitter is typically less than about 125 micrometers, more typically less than 75 micrometer, and preferably less than 50 micrometers, and thickness may go down to 15 micrometers for applications such as automobile paint). Multi-layer films suitable for use in making glitter according to the present invention preferably have sufficient inter-layer adhesion to prevent delamination during the conversion process. The thickness of the film (in the z direction) from which glitter according to the present invention is preferably about 3 to about 25% of the smallest glitter particle dimension (i.e., measured in the respective x and y directions). Preferably, the glitter is sufficiently thick to remain flat in application, but not so thick as to create substantial edge effects (i.e., distortions on cut edges of the glitter particles that extend into a substantial portion of the film thickness).

The glitter may be incorporated into a matrix material material (e.g., a cross-linked polymeric material) in one or more subsequent steps. In one embodiment the glitter is dispersed (e.g., uniformly or non-uniformly) within a translucent (including transparent) matrix material such that at least a portion of the glitter is observable by a viewer of the composite material comprising the matrix material and the glitter. The matrix material need not be translucent (i.e., can be opaque) provided that glitter is at the outer surface of the matrix material such that at least a portion of the glitter is observable by a viewer of the article. The glitter made according to the present invention may also provide an article or composition comprising a substrate, a matrix disposed on the substrate, and a plurality of glitter disposed in the matrix.

Techniques for incorporating glitter made according to the present invention into the matrix material include those known in the art for incorporating conventional glitters into matrix materials. For example, glitter can be dispersed in a liquid, for example, by mixing or otherwise agitating the liquid with glitter therein. Dispersion of the glitter in the liquid may be aided, for example, with the use of dispersion aids. In some cases, a liquid having glitter dispersed therein is a precursor for a composite article derived therefrom. For example, glitter can be dispersed in a curable polymeric material wherein the glitter containing polymeric material is placed in a mold having the shape of the desired final article, followed by the curing of the polymeric material.

Articles comprising glitter-containing matrix materials may be made by any of a variety of techniques including cast molding, injection molding (particularly useful, for example, to make three-dimensional articles); extrusion (particularly useful, for example, to make films, sheet materials, fibers and filaments, cylindrical tubes, and cylindrical shells (i.e., pipe). Sheet or film materials may comprise a single layer or a plurality of layers (i.e., a multiple-layered construction). Multiple layer constructions may have the glitter in one or more of the layers, and may optionally contain different shapes, sizes, and concentrations of glitter in different layers. Further, for example, glitter made according to the present invention may be incorporated into, or mixed with, polymer pellets suitable for injection molding. Other examples of processes for incorporating glitter according to the present invention into a matrix material of a finished article include vacuum molding, blow molding, rotomolding, thermoforming, extruding, compression molding, and calendering.

Articles incorporating glitter made according to the present invention may, for example, have the glitter uniformly or non-uniformly (including randomly) dispersed therein and/or thereon, as well have some areas with the glitter uniformly or non-uniformly dispersed therein and/or thereon, and other areas wherein it is non-uniformly or uniformly, respectively, dispersed therein and/or thereon. Further, the glitter may be present such that there are concentration gradients of glitter.

The present process may include the step of orientation of the glitter in the matrix material. The glitter particles may, for example, be random with respect to one another, or have substantially the orientation relative to one another or relative to a surface of the matrix material. Alignment or orientation of the glitter within the matrix material may be provided, for example, by high shear processing (e.g., extrusion or injection molding) of glitter-containing matrix material which results in orientation or alignment of the glitter along the flow direction of the matrix material. Other techniques for orientating the glitter within a matrix material may be apparent to those skilled in the art after reviewing the disclosure of the present invention.

The glitter may also be randomly or uniformly distributed over the surface of an article, and can be random in some areas of the surface and uniform in others. Further, for example, the glitter can be randomly or uniformly (e.g., uniformly spaced) oriented with respect to the surface, and can be randomly oriented in some areas and uniformly oriented in others. The glitter can be patterned to provide, or be a part of, copyrightable material or a trademark (e.g. movie or TV characters), including a registered or registrable trademark under any of the laws of the countries, territories, etc. of the world. Optionally, a coating (e.g., a clear coating) may be applied over at least a portion of the glitter to provide additional bonding to the substrate, to provide protection to the glitter, or to provide a more visually appealing effect.

Turning again to liquids having glitter according to the present invention therein, such dispersions, or dispersible combinations may be solvent-borne (i.e., dissolved in an organic solvent), water-borne (i.e., dissolved or dispersed in water), single component, or multi-component. When the dispersions, or dispersible combinations are to be used to provide a coating on a surface, the liquid may preferably be a film-forming material.

Examples of liquid mediums, although the compatibility (e.g., chemical compatibility), and hence the suitability of a particular liquid will depend, for example on the composition of the glitter, as well as other components of the dispersions, or dispersible combinations, include water, organic liquids (e.g., alcohols, ketones (for a short period of time)), and mixtures thereof. It is noted that some matrix materials may sometimes be liquids, and other times a solid. For example, at room temperature, typical hot melt adhesive materials are solids, whereas when heated to their respective melting points, they are liquids. Further, for example, liquid glue, prior to curing and/or drying is a liquid, but after curing and/or drying, is a solid.

The dispersions, or dispersible combinations, may be, for example, dryable, curable, or the like to form yet another matrix (e.g., a paint may be dried or cured to provided a solid or hardened form). The dispersions, or dispersible combinations, may include additives (e.g., antimicrobials, antistats, blowing agents, colorants or pigments (e.g., to tint, or otherwise impart or alter the color of, the matrix material), curatives, thinners, fillers, flame retardants, impact modifiers, initiators, lubricants, plasticisers, slip agents, stabilizers, and coalescing aids, thickening aids, dispersion aids, defoamers, and biocides) which provide, for example, a desirable feature or property in the desired final composite (comprising the glitter), and/or aid in the processing step(s) to make the desired final composite (comprising the glitter).

In one aspect, the dispersion, or dispersible combination includes binder precursor material (i.e., a material that is convertable from a liquid (i.e., a flowable form; e.g., polymers dissolved in a solvent, polymer precursors dissolved in a solvent, polymer emulsions, and curable liquids) into a solidified or hardened form. Processes to convert a liquid binder precursor material to a solidified or hardened binder material include evaporation of a solvent, curing (i.e., hardening via chemical reaction), and combinations thereof.

Additional examples of binder precursors and binders for the dispersions, or dispersible combinations, containing glitter according to the present invention include vinyl polymers, vinyl-acrylic polymers, acrylic polymers, vinylchloride acrylic polymers, styrene/butadiene copolymers, styrene/acrylate copolymers, vinyl acetate/ethylene copolymers, animoalkyl resin, thermosetting acrylic resins, nitrocellulose resins, modified acrylic lacquer, straight chain acrylic lacquer, polyurethane resin, acrylic enamel resin, silyl group-containing vinyl resin, and combinations thereof.

Examples of dispersions or dispersible combinations, that can contain glitter according to the present invention include fingernail polish, paint (including paint for automotive and marine applications, indoor and outdoor house paint, art and crafts paint, hobby paints (e.g., toy model paints), and finger paints). Such dispersions or dispersible combinations, are typically applied to a surface to provide a coating which is subsequently dried, cured, or the like to provide a hardened or non-wet surface coating.

The size, shape, thickness, and amount of glitter used in a particular application, including applications described herein, may depend on a number of factors, including the desired effect to be achieved, cost, inherent limitations of the application (e.g., if the glitter is in a binder material, the amount of glitter should not exceed the loading capacity of the binder matrix, unless it is desired for excess glitter to easily fall out), and for liquid matrices, the viscosity of the dispersions, or other physical properties or performance characteristics of a matrix having the glitter therein. Glitter made according to the present invention may also be applied to a surface by first applying a binder or adhesive material, then applying the glitter, followed by drying, curing, solidification, or the like of the binder or adhesive material. Examples of substrate for adhering the glitter to include toys, fabrics, sheet materials (e.g., paper, cardboard, and films), ornaments, plastics, wood, and metal. Adhering glitter to the surface of a substrate can, for example, provide a decorative effect.

The glitter may be adhered to the surface using any suitable form of attachment, such as glue, pressure sensitive adhesive, hot-melt adhesive, and stitching. When adhered with adhesive materials, the glitter can, for example, be placed onto, or broadcasted over, the surface of the adhesive-coated substrate. Placement of the glitter relative to the substrate may be provided in any of a variety of desired patterns and/or orientations. For example, the glitter can be randomly or uniformly over the surface, and can be random in some areas of the surface and uniform in others. Further, for example, the glitter can be randomly or uniformly (e.g., uniformly spaced) oriented with respect to the surface, and can be randomly oriented in some areas and uniformly oriented in others. The glitter can be patterned to provide, or be a part of, copyrightable material or a trademark (e.g. movie or TV characters), including a registered or registerable trademark under any of the laws of the countries, territories, etc. of the world. Optionally, a coating (e.g., a clear coating) may be applied over at least a portion of the glitter to provide additional bonding to the substrate, to provide protection to the glitter, or to provide a more visually appealing effect.

Additional processing steps such as are commonly known in the film processing art may also be used in the processing of coextruded polymeric multilayer optical films of the present invention. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for making a multilayered optical film, comprising:
   (a) providing at least a first and a second stream of resin;
   (b) providing a feeder tube plate having a first plurality of conduits, and having a second plurality of conduits interleaved with the first plurality of conduits;
   (c) feeding the first stream into the first plurality of conduits and the second stream into the second plurality of conduits;
   (d) providing a slot die for each of the first and second plurality of conduits such that the first and second streams are divided into a plurality of interleaved layers to yield a composite stream;
   (e) passing the composite stream through an extrusion die to form a multilayer web in which each layer is generally parallel to the major surface of adjacent layers; and
   (f) heating the first and second streams of resin with at least one axial rod heater that extends along at least one of the first and second plurality of conduits.

2. The method of claim 1, further comprising:
   (g) positioning the at least one axial rod heater proximate the first and second plurality of conduits.

3. The method of claim 1, further comprising:
   (g) positioning the at least one axial rod heater between the first and second plurality of conduits.

4. The method of claim 1, further comprising:
   (g) varying temperature of the at least one axial rod heater in zones along a length of the axial rod heater.

5. The method of claim 1, wherein the heating step comprises heating with a plurality of axial rod heaters.

6. The method of claim 5, wherein the healing step comprises heating with a first axial rod heater disposed proximate the first plurality of conduits and heating with a second axial rod heater disposed proximate the second plurality of conduits.

7. The method of claim 1, further comprising after step (d):

(g) passing the composite stream into a multiplier where the composite stream is divided into a plurality of substreams, the multiplier expanding at least one of the substreams in a direction transverse to its direction of flow; and (h) recombining the substreams to increase the number of layers in the composite stream.

8. The method of claim 1, further comprising:

(g) casting the multilayer web onto a casting roll to form a cast multilayer film.

9. The method of claim 8, further comprising:

(h) quenching said multilayer web during the casting step.

* * * * *

UNITED STATES PATENT AND TRADEMARK OFFICE
CERTIFICATE OF CORRECTION

PATENT NO. : 6,827,886 B2
DATED : December 7, 2004
INVENTOR(S) : Neavin, Terence D.

It is certified that error appears in the above-identified patent and that said Letters Patent is hereby corrected as shown below:

Column 10,
Line 19, delete "isomeric norbornene" and insert -- isomeric norbornane --, therefor.

Column 15,
Line 35, delete "usefull" and insert -- useful --, therefor.

Column 17,
Line 67, delete "Theological" and insert -- rheological --, therefor.

Column 18,
Line 65, delete "0.778A0.111B0.111A0.778B0.111A0.111B" and insert
-- .778A.111B.111A.778B.111A.111B --, therefor.

Column 23,
Line 44, delete "Theological" and insert -- rheological --, therefor.

Column 28,
Line 7, delete "Theological" and insert -- rheological --, therefor.

Column 37,
Lines 4-12, after "varied" delete "Periodic color variations may also be imparted to the film by embossing it with a pattern. Due in part to the fact that the embossed portion is no longer coplanar with the rest of the film, it will exhibit a different color or colors than the rest of the film. Thus, striking effects have been produced by embossing the color shifting films of the present invention with, for example, a fishnet pattern (e.g., gold on a red background) or an emblem." and insert the same in Line 5 as a new paragraph.

Column 42,
Line 58, delete "Irganox$^{TM}$ 57" and insert -- Irganox$^{TM}$ L 57 --, therefor.

Column 43,
Line 3, delete "Ethanox 330" and insert -- Etanox 330 --, therefor.

UNITED STATES PATENT AND TRADEMARK OFFICE
CERTIFICATE OF CORRECTION

PATENT NO. : 6,827,886 B2
DATED : December 7, 2004
INVENTOR(S) : Neavin, Terence D.

It is certified that error appears in the above-identified patent and that said Letters Patent is hereby corrected as shown below:

<u>Column 48,</u>
Line 66, delete "healing" and insert -- heating --, therefor.

Signed and Sealed this

Nineteenth Day of April, 2005

JON W. DUDAS
*Director of the United States Patent and Trademark Office*